US006128102A

United States Patent [19]

Ota

[11] Patent Number: 6,128,102

[45] **Date of Patent: *Oct. 3, 2000**

[54] APPARATUS AND METHOD FOR FILING, REGISTERING, AND RETRIEVING IMAGE FILES

[75] Inventor: Junichi Ota, Saitama, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,349

[22] Filed: Jan. 27, 1997

[30] Foreign Application Priority Data

| | | | |
|---|---|---|---|
| Jan. 31, 1996 | [JP] | Japan | 8-035840 |
| Jan. 31, 1996 | [JP] | Japan | 8-035842 |
| Aug. 13, 1996 | [JP] | Japan | 8-229396 |

[51] Int. Cl.[7] .......... H04N 1/00

[52] U.S. Cl. .......... 358/403; 382/190; 382/195; 382/201; 382/206; 382/305

[58] Field of Search .......... 382/305–306, 382/181, 185, 190–206, 173, 176–177; 358/401, 403, 207, 187; 707/1, 104; 345/447–443, 433

[56] References Cited

U.S. PATENT DOCUMENTS

| | | | |
|---|---|---|---|
| 4,748,678 | 5/1988 | Takeda et al. | 382/306 |
| 5,050,221 | 9/1991 | Ohta et al. | 382/177 |
| 5,111,514 | 5/1992 | Ohta | 382/177 |
| 5,195,147 | 3/1993 | Ohta | 382/185 |
| 5,357,602 | 10/1994 | Ohta | 345/442 |
| 5,406,384 | 4/1995 | Sakuragi | 358/403 |
| 5,436,981 | 7/1995 | Ishikawa | 382/173 |
| 5,625,810 | 4/1997 | Kurosu et al. | 707/1 |
| 5,628,003 | 5/1997 | Fujisawa et al. | 707/104 |

*Primary Examiner*—Leo H. Boudreau
*Assistant Examiner*—Ishrat Sherali
*Attorney, Agent, or Firm*—McDermott, Will & Emery

[57] ABSTRACT

When an image file is to be registered, image data is read from a document; features of the document are extracted from the read-out image data; the image file is generated with the extracted document features correlated to the read-out image data for storage, and further in a case wherein an image file is to be retrieved, image data is read from a document, features of the document are extracted from the read-out data, and an image file having document features identical to the information for retrieval from image files with the extracted document features stored therein as information for retrieval.

12 Claims, 34 Drawing Sheets

FIG.11

| No. | TYPE | WIDTH | HEIGHT |
|---|---|---|---|
| 1 | LATERAL SEPARATOR | 250 | 3 |
| 2 | CHARACTER | 250 | 40 |
| 3 | LATERAL SEPARATOR | 250 | 2 |
| 4 | CHARACTER | 60 | 120 |
| 5 | GRAPH | 60 | 40 |
| 6 | LATERAL SEPARATOR | 160 | 2 |
| 7 | CHARACTER | 60 | 140 |
| 8 | TABLE | 60 | 20 |
| ... | ... | ... | ... |
| 19 | TABLE | 55 | 18 |

FIG.15

| LINE | OFFSET FOR STARTING LINE | LENGTH OF LINE |
|---|---|---|
| 1 | 2 | 40 |
| 2 | 10 | 60 |
| 3 | 20 | 70 |
| 4 | 20 | 80 |
| 5 | 10 | 70 |
| 6 | 20 | 160 |
| 7 | 30 | 40 |
| 8 | 30 | 60 |
| ... | ... | ... |
| 11 | 10 | 30 |

FIG.18

| LINE | OFFSET FOR STARTING LINE | NUMBER OF RECTANGLES IN LINE |
|---|---|---|
| 1 | 2 | 6 |
| 2 | 10 | 8 |
| 3 | 20 | 9 |
| 4 | 20 | 10 |
| 5 | 10 | 9 |
| 6 | 20 | 13 |
| 7 | 30 | 8 |
| 8 | 30 | 11 |
| ... | ... | ... |
| 11 | 10 | 4 |

FIG.27

| ORDER OF READING | TYPE |
|---|---|
| 1 | LATERAL SEPARATOR |
| 2 | CHARACTER |
| 3 | LATERAL SEPARATOR |
| 4 | CHARACTER |
| 5 | GRAPH |
| 6 | LATERAL SEPARATOR |
| 7 | CHARACTER |
| 8 | TABLE |

| | |
|---|---|
| 19 | TABLE |

FIG.33

| No. | CHARACTER AREA No. | LINE No. | RECTANGLE No. |
|---|---|---|---|
| 1 | 2 | 3 | 4 |
| 2 | 2 | 5 | 8 |
| 3 | 2 | 8 | 4 |
| 4 | 3 | 1 | 8 |
| 5 | 3 | 4 | 4 |
| 6 | 3 | 6 | 8 |
| 7 | 4 | 9 | 4 |
| 8 | 4 | 11 | 8 |

------------------------------------

| | | | |
|---|---|---|---|
| 26 | 7 | 10 | 8 |

FIG.34

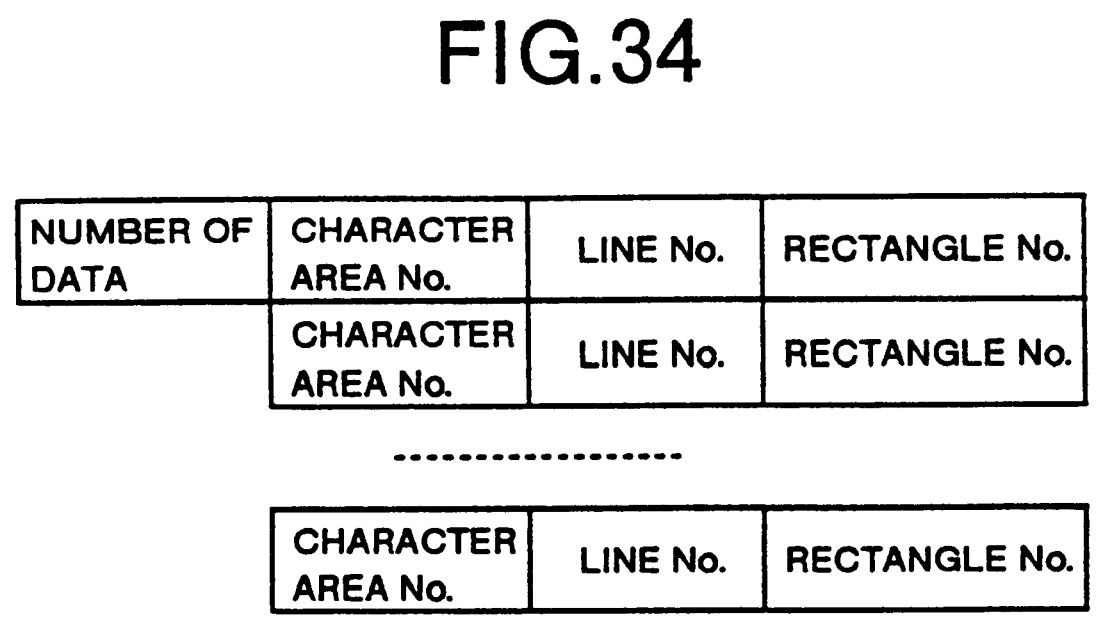

| | | | |
|---|---|---|---|
| NUMBER OF DATA | CHARACTER AREA No. | LINE No. | RECTANGLE No. |
| | CHARACTER AREA No. | LINE No. | RECTANGLE No. |

------------------

| | | | |
|---|---|---|---|
| | CHARACTER AREA No. | LINE No. | RECTANGLE No. |

APPARATUS AND METHOD FOR FILING, REGISTERING, AND RETRIEVING IMAGE FILES

FIELD OF THE INVENTION

The present invention relates to an image filing method of storing image data read from a document as an image file and retrieving and outputting a desired image file from stored image files and an image filing apparatus for the same, and more particularly to an image filing method of automatically extracting features of a document from read image data, registering and retrieving an image file using the extracted features of the document and an image filing apparatus for the same.

BACKGROUND OF THE INVENTION

In an image filing method and an image filing apparatus based on the conventional technology, when a document is registered as an image file, a user inputs a title, a key word, or the like in the image file to be registered, and when a registered image file is retrieved, a user specifies a title of or a keyword for a desired image file to retrieve and have the image file outputted using the title or the keyword as a key for retrieval.

In the image filing method and an image filing apparatus based on the conventional technology as described above, although it is possible to retrieve a particular image file from a plurality of registered image files by specifying a title or a keyword, when an image file is registered, each user inputs a title or a keyword in a way specific to each user, so that, when another user tries to retrieve any image file, if the title or keyword as a key for retrieval of a desired image file are unknown to the user, the user can not retrieve the desired image file.

Also when an image file is registered, it is necessary to input a unique and easy-to-understand title or keyword, the work is disadvantageously complicated.

Further, as each user inputs a title or a keyword in a way specific to the user, sometimes the same title or same keyword may be assigned to a plurality of image files, so that, in some cases, it is very difficult to retrieve a desired image file within a short period of time, which is disadvantageous.

SUMMARY OF THE INVENTION

It is an object of the present invention to provide an image filing method and an image filing apparatus in which it is possible to register an image fire without inputting a title or a keyword and also to retrieve a desired image file according to the necessity.

It is another object of the present invention to provide an image filing method and an image filing apparatus in which it is possible to retrieve a desired image file from the document even in a case where the title or keyword is unknown, or in a case where an identical title or an identical keyword is assigned to a plurality of image files.

With the present invention, feature of a document is extracted from read-out image data and stored when an image file is to be registered, and a desired image file can be retrieved by extracting features of a document in the read-out image data and using the extracted features as information for retrieval when the image file is to be retrieved.

With the present invention, features of a document are extracted from read-out image data and stored when an image file is to be registered, and a desired image file can be retrieved by extracting features of a document in the read-out image data and using the extracted features as information for retrieval when the image file is to be retrieved. Because of the features, by reading out a sheet of a document from a series of filed documents, it is possible to retrieve a file including the document and output the file on recording paper or the like.

With the present invention, information for an area (format information) such as a text area and a photograph area in a document image is automatically extracted and used as features of or retrieval information for the document.

With the present invention, distance from boundary of a text area to a line included in the text area in a document image and a length of the line are used as features of the document or retrieval information.

With the present invention, information for a starting position of a line as well as for the number of rectangles of characters included in the line is used as features of the document, which improves precision in discriminating an image file.

With the present invention, features of a document are extracted from read-out image data and stored when an image file is to be registered, and a desired image file can be retrieved by extracting features of the document in the read-out image data and using the extracted features as retrieval information when the image file is to be retrieved, and at the same time, it is also possible to retrieve the image file by inputting a title or a keyword.

With the present invention, features of a document are extracted from read-out image data and stored when an image file is to be registered, and a desired image file can be retrieved by extracting features of a document in the read-out image data and using the extracted features as retrieval information when the image file is to be retrieved. Because of this feature, by reading out a sheet of the document from a series of filed documents, it is possible to retrieve a file including the document and output the file on recording paper or the like. Especially with the invention as claimed in Claim 7, it is possible to retrieve a file according to information for arrangement of regular-size characters, half-size characters, or alphabetic characters in a document. This feature is effective for discrimination (retrieval) of any one of images in magazines or newspapers having a similar layout respectively.

With the present invention, it is possible to retrieve a file according to positional information on a small rectangle of character such as a punctuation mark in a sentence. This feature is effective for discrimination (retrieval) of images in magazines or newspapers having a similar layout respectively, and enables storage of feature of a document with a small memory space.

With the present invention, features of a document are extracted from read-out image data and stored when an image file is to be registered; and a desired image file can be retrieved by extracting features of a document in the read-out image data and using the extracted features as retrieval information when the image file is to be retrieved, and at the same time, it is also possible to retrieve the image file by inputting a title or a keyword.

Other objects and features of this invention will become understood from the following description with reference to the accompanying drawings.

BRIEF DESCRIPTION OF THE DRAWINGS

FIG. 11 is an explanatory view showing an example of data obtained after extracting an area;

FIG. 15 is an explanatory view showing an example of computing an offset for starting a line and a length of the line;

FIG. 18 is an explanatory view showing an example of computing an offset for starting a line and the number of rectangles in the line according to Embodiment 4;

FIG. 27 is an explanatory view showing an example of a result of determination of an area performed each time a reading operation is executed according to Embodiment 5;

FIG. 33 is an explanatory view showing positions of extracted small rectangle indicated by a character area number, a line number in a text area, and a rectangle number in the line respectively according to Embodiment 6; and FIG. 34 is an explanatory view showing an example of a keyword prepared according to a result of FIG. 33.

DESCRIPTION OF THE PREFERRED EMBODIMENTS

Detailed description is made hereinafter for a case where the image filing method and image filing apparatus according to the present invention are applied to a digital copying machine as an example with reference to the related drawings in the order of Embodiment 1, Embodiment 2, Embodiment 3, Embodiment 4, Embodiment 5, and Embodiment 6.

Figure 1:
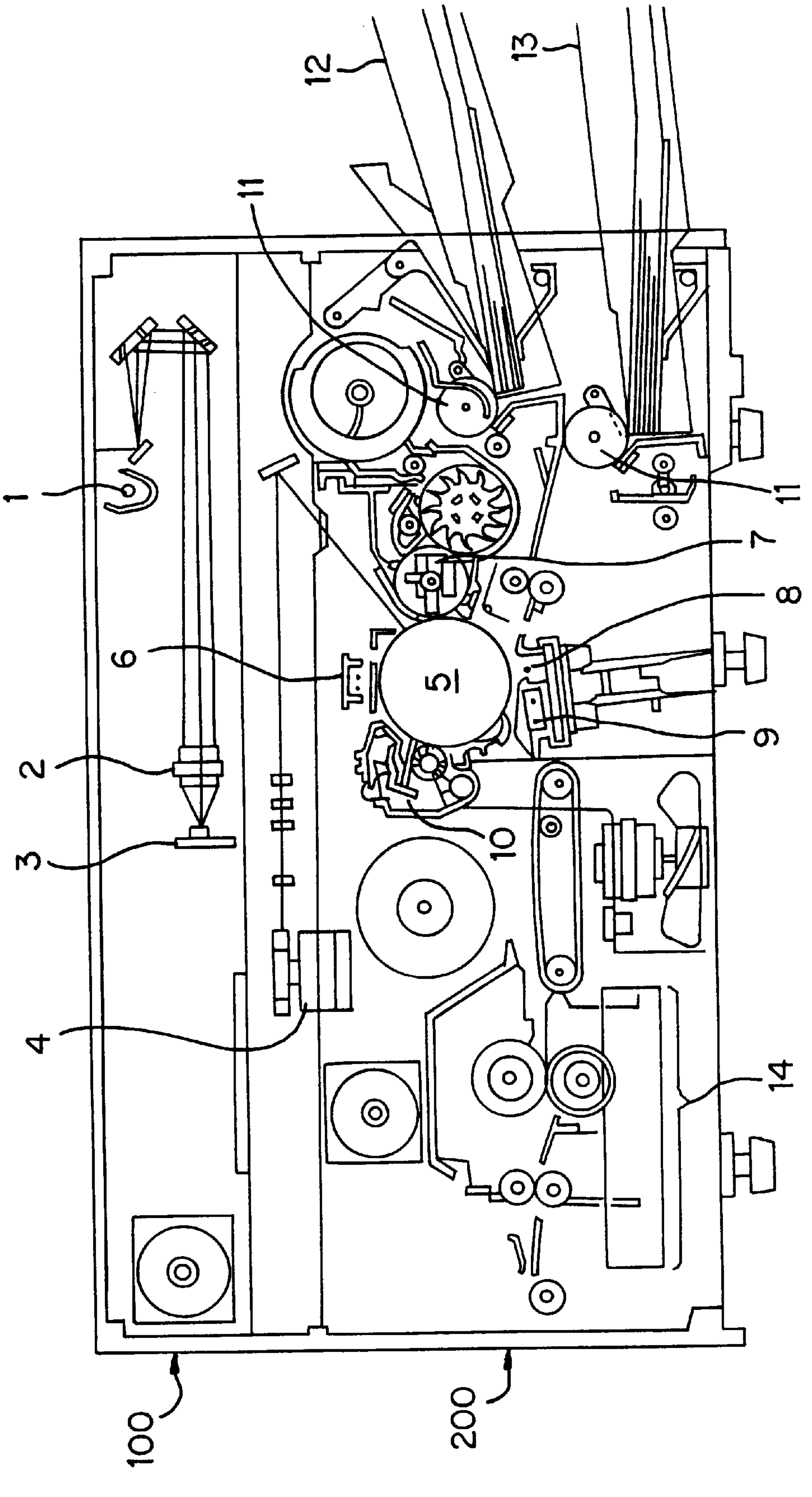
FIG. 1 is an explanatory view showing configuration of a digital copying machine according to Embodiment 1.

FIG. 1 shows configuration of a digital copying machine according to Embodiment 1. The digital copying machine according to Embodiment 1 is largely divided into two sections which are an image scanner 100 provided in the upper section thereof and a laser printer 200 provided under the image scanner.

At first, description is made for basic configuration and operations of the digital copying machine. The image scanner 100 has a contact glass (not shown herein) for placing thereon a document provided on the uppermost section of the machine and has an optical scanning system provided below the contact glass. The document placed on the contact glass is exposed to an exposing lamp 1 of the optical scanning system and an image is formed on the light-receiving section 3 with a reflected light (namely, an image light) when it is exposed to light through various types of mirror and lens each provided in the optical scanning system. A first-dimensional CCD image sensor (a color CCD image sensor 110 described later) is provided in this light-receiving section 3.

The optical scanning system is driven in the direction from side to side in the drawing by a driving system (not shown herein), so that an image light obtained by exposing each section of the document surface to light is successively read out by the color CCD image sensor 110 described later for each line in the scanning direction as image data.

The image data read out by the color CCD image sensor 110 is converted to an output image through the processing described later and modulates a laser beam outputted from a writing device 4 of the laser printer 200. The laser beam modulated by the image data is formed as an image on the surface of a photoconductive drum 5 through the optical system for write. The entire surface of the photoconductive drum 5 at this point of time is previously and uniformly electrified to a prespecified high potential by a main charger 6, and when it is irradiated with an image light (laser beam), the potential is changed according to an amplitude of the light with a potential distribution corresponding to an image, namely a static latent image formed thereon.

The static latent image formed on the photoconductive drum 5 absorbs toner when passing through a photo-developing unit 7 and is visualized, so that a toner image is formed thereon.

On the other hand, recording paper (not shown herein) is fed out from either selected one of paper-feeding cassettes 12 or 13, and the recording paper is fed onto the photoconductive drum 5 so that the paper is superimposed on the surface thereof in synchronism with a timing for forming a toner image thereon. Then, the toner image on the photoconductive drum 5 is transferred onto the recording paper with a transfer charger 8 energized. Furthermore, the recording paper with the toner image transferred thereon is separated from the photoconductive drum 5 with an energized separating charger 9, and when the transferred toner image thereon is fixed by a fixing unit 14, the recording paper is discharged to outside of the copying machine.

After the operations for transferring the image onto the paper and for separating the paper with the image thereon from the photoconductive drum 5 are finished, the surface of the photoconductive drum 5 is cleaned by a cleaning unit 10 to prepare for forming an image next time.

Figure 2:
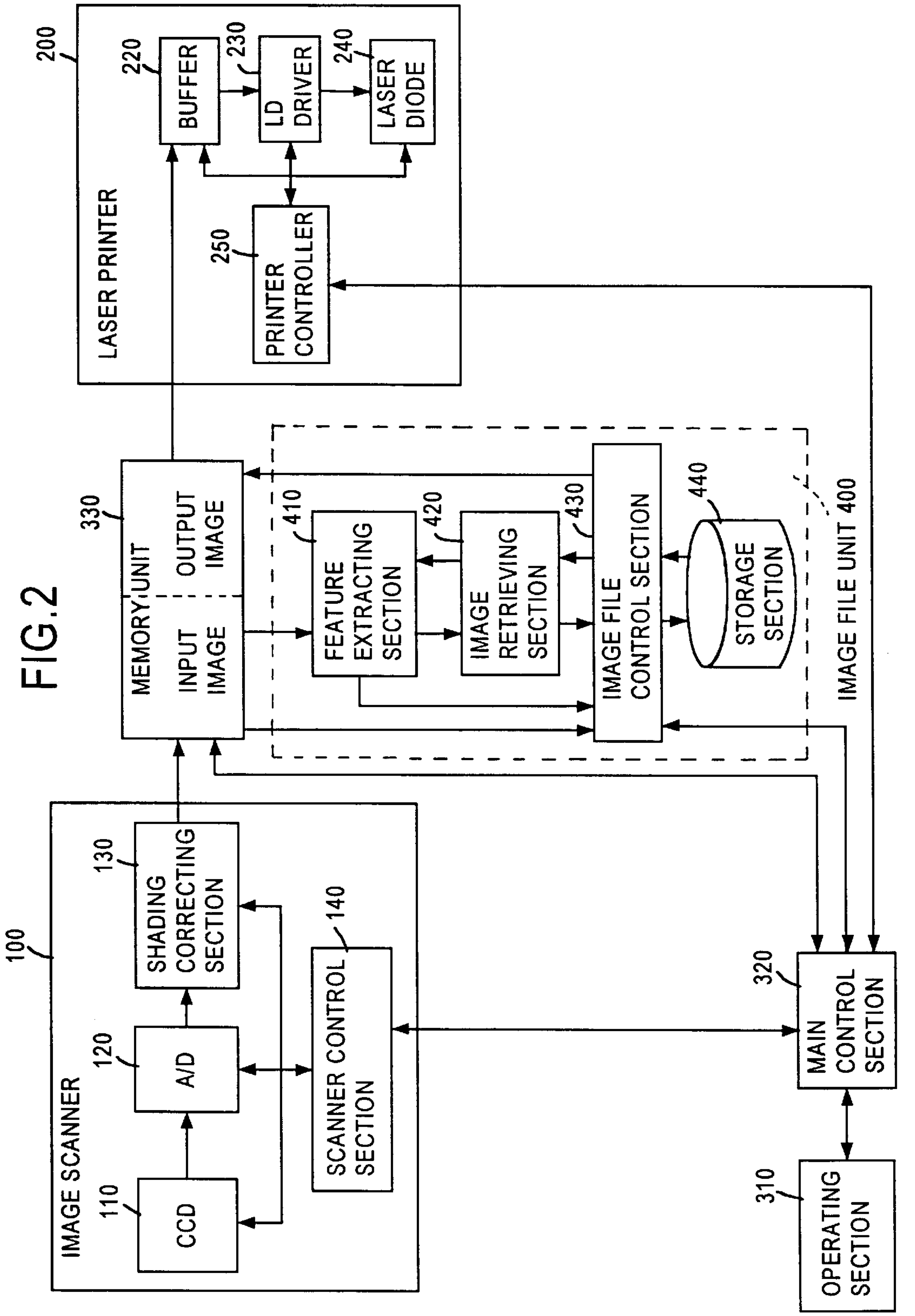
FIG. 2 is a view showing configuration of a transmitting section of the digital copying machine according to Embodiment 1.

Next description is made for configuration of an image transmitting section of the digital copying machine according to Embodiment 1 with reference to FIG. 2. In the image scanner 100, analog signals (image data) for a document image with bitmap format read out by the color CCD image sensor 110 are converted to digital signals by an A/D converter 120, then subjected to correction for dispersion in the density level by a shading correcting section 130, and an image obtained thereby is stored in a memory unit 330. It should be noted that the reference numeral 140 indicates a scanner control section for controlling the image scanner 100 according to a command from a main control section 320 described later.

An image file unit 400 stores, as described later, data for input images on the memory unit 330, extracts feature (feature of a document according to the present invention) from an input image, and retrieves the same image as the input image from stored images to form an output image on the memory unit 330.

Each pixel constituting the output image formed on the memory unit 330 is applied to the laser printer 200 in a form of binary information corresponding to white/black, and applied to a laser diode 240 as an energizing signal through a buffer 220 and an LD driver 230. For this reason, the laser diode 240 outputs a laser beam modulated in accordance with the image data (output image information). The laser beam outputted from the laser diode 240 is outputted from the writing device 4 and irradiated to the surface of the photoconductive drum 5 through the optical scanning system for write. It should be noted that the reference numeral 250 indicates a printer controller for controlling the laser printer 200.

Any instruction from a user is executed through key entry from an operating section 310 provided on the top surface of the digital copying machine. The main control section 320 controls various types of display on the operating section 310 and also executes operations for copying as well as for registering/retrieving image files according to an key entry from the operating section 310.

With the configuration as described above, next description is made for the operations in the order of 1) processing for registering an image file according to Embodiment 1, 2) processing for retrieving an image file according to Embodiment 1, and 3) processing for registering/retrieving an image file in a case where any title or keyword is inputted.

Figure 3:
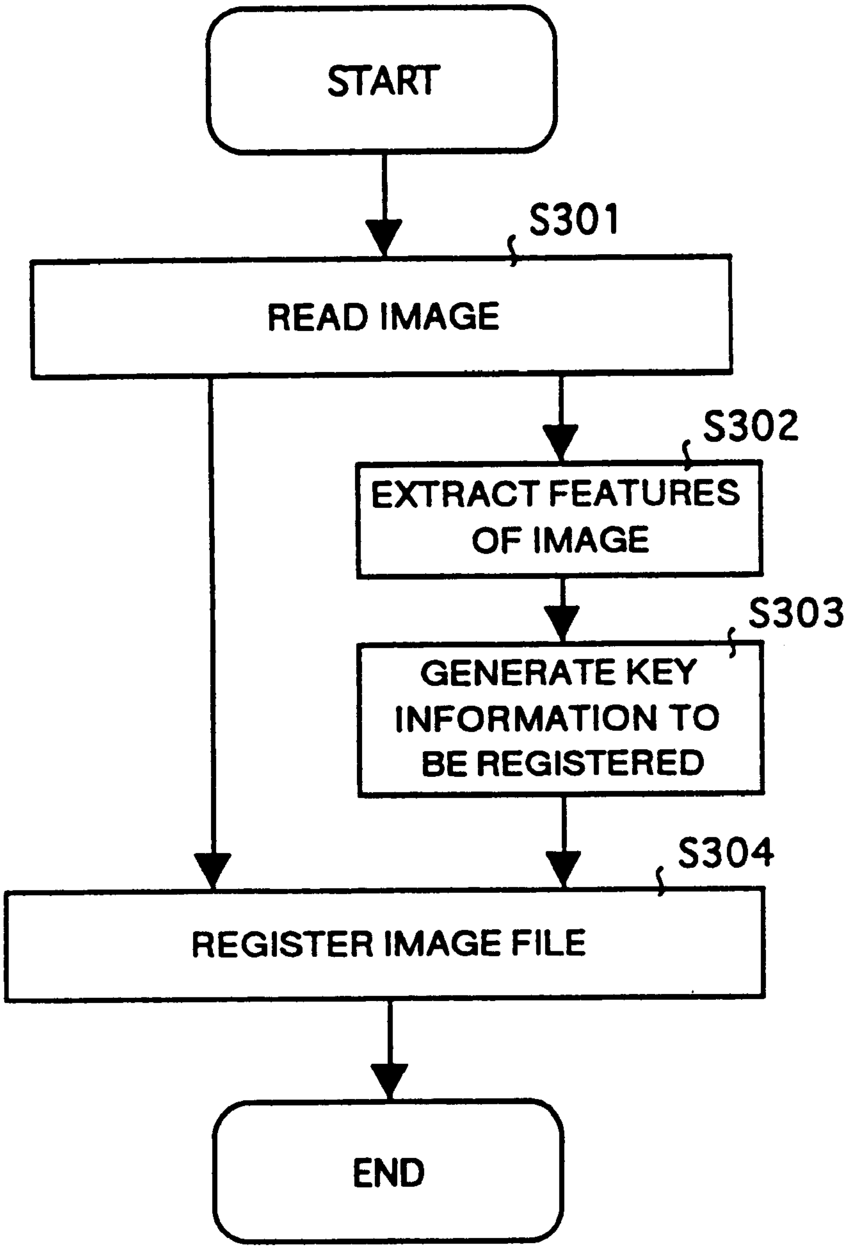
FIG. 3 is a flow chart showing the processing of registering an image file according to Embodiment 1.

FIG. 3 shows a flow chart of processing for registering an image file according to Embodiment 1, and at first, when an image registering mode for reading out a document through the operating section 310 and registering it as an image file is selected, the main control section 320 has the image scanner 100 read out an image of the document (image data) and the memory unit 330 store therein the image as an input image (S301). On the other hand, an image file control section 430 receives a notice that the image registering mode has been selected from the main control section 320, has a feature extracting section 410 extract any feature from the input image (image data) in the memory unit 330 (S302), generates key information to be registered from the extracted feature (S303), then generates an image file with the generated key information to be registered correlated to the input image in the memory unit 330 to register the image file in a storage section 440 (S304), whereby the processing is finished.

Figure 4:
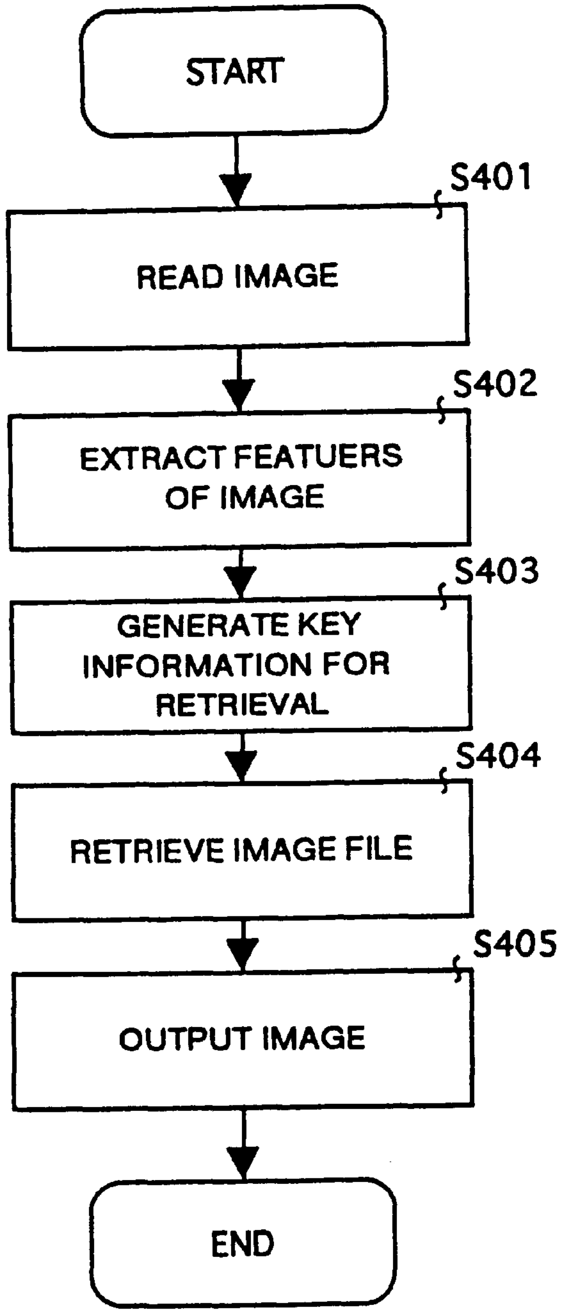
FIG. 4 is a flow chart showing the processing of retrieving an image file according to Embodiment 1.

FIG. 4 shows a flow chart of processing for retrieving an image file according to Embodiment 1, and at first, when an image retrieving mode for retrieving any registered image file through the operating section 310 is selected, the main control section has the image scanner 100 read out an image of a document and the memory unit 330 store therein the image as an input image (S401). Then, the image file control section 430 receives a notice that the image registering mode has been selected from the main control section 320, the feature extracting section 410 extracts any features from the input image (image data) stored in the memory unit 330 (S402), then an image retrieving section 420 generates key information for retrieval from the extracted features (S403) and retrieves any image file having the key information to be registered identical to the key information for retrieval from the storage section 440 (S404). When the image file control section 430 sends out an appropriate image file to the memory unit 330 as an output image, the image file is sent to the laser printer 200 through the memory unit 330 to be outputted to recording paper (S405). It should be noted that features of a document (image data) can be obtained by using, for instance, a distribution of black pixels in the image or the number of pixels in each unit area or the like.

Description is made for processing for registering/retrieving an image file in a case where any title or keyword is inputted. It is assumed herein that the digital copying machine according to Embodiment 1 has the configuration in which any title or keyword can be specified according to selection by a user through the operating section 310 when an image file is to be registered. However, specification of a title or a keyword is not always necessary, and for this reason, in a case where any title or keyword is not specified, either 1) the processing for registering an image file according to Embodiment 1 or 2) the processing for retrieving an image file according to Embodiment 1 each described above is automatically executed.

For instance, in a case where an image file is to be registered, if any title or keyword is inputted through the operating section 310, the image file control section 430 generates an image file with the title or keyword correlated to the prepared key information to be registered as well as to the input image (namely the read-out image data) in the memory unit 330 to store the image file in the storage section 440.

In a case where an image file is to be retrieved, if any title or keyword is inputted through the operating section 310, the image retrieving section 420 retrieves any image file having an appropriate title or keyword from the image files stored in the storage section 440 by using the inputted title or keyword and outputs the image file. However, it is needless to say that the retrieval is impossible in a case where any title or keyword corresponding to any image file to be retrieved is not previously registered in the storage section. In this case, key information for retrieval is generated from the input image read from the document in the method indicated in 2) the processing for retrieving an image file according to Embodiment 1, and the image file is retrieved with the key information for retrieval.

As described above, with Embodiment 1, even any keyword is not inputted when an image file is to be registered in the storage section 440, key information to be registered is generated by automatically extracting features in the image of a document, which makes it easier to operate a work for registering an image file. When an image file is to be retrieved, the operation for retrieval is also easy because key information for retrieval is generated by automatically extracting features in the image of a document and an appropriate image file is retrieved by using the key information for retrieval.

Also, with Embodiment 1, it is possible to provide an image filing apparatus in which any image file can be registered in the storage section 440 and any appropriate image file can speedily be retrieved according to the read image of the document. With this feature, by reading a sheet of document among registered series of documents (image file), it is possible to retrieve any image file including the document and to output the image file onto recording paper or the like.

A digital copying machine (an image filing apparatus) according to Embodiment 2 has the same configuration as that according to Embodiment 1, in which the feature extracting section 410 extracts information for any area in read-out image data as features of a document.

Figure 5:
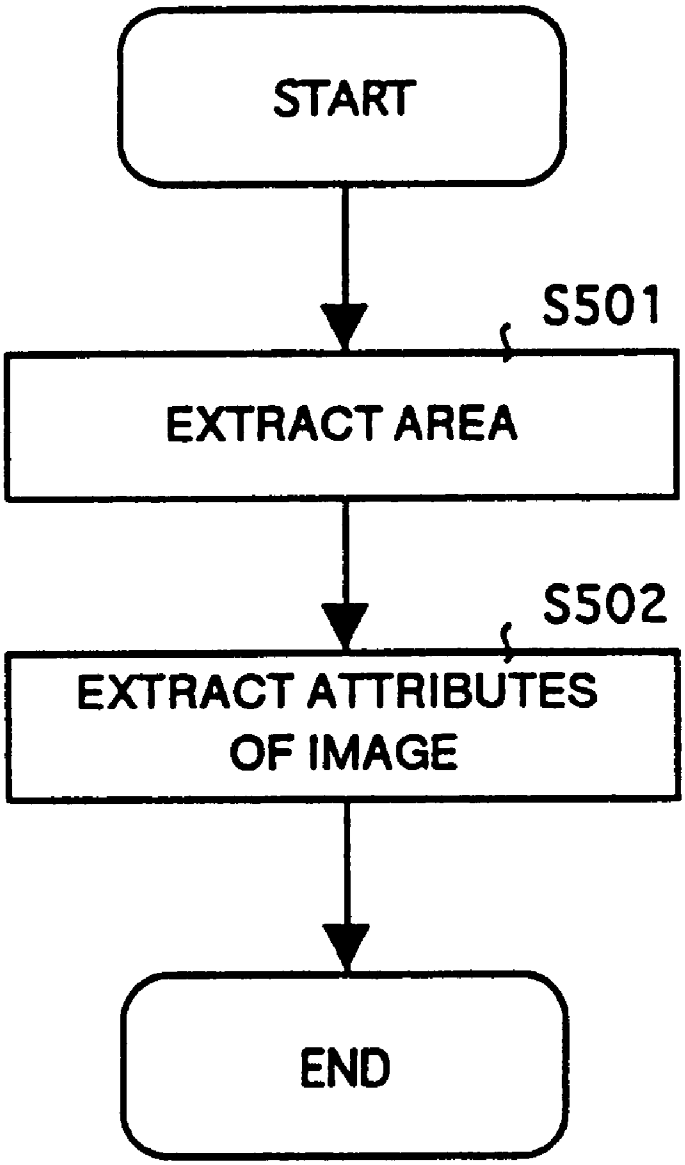
FIG. 5 is a flow chart showing the processing for extracting features according to Embodiment 2.

FIG. 5 is a flow chart of processing for feature extraction according to Embodiment 2. At first, the feature extracting section 410 receives an input image from the memory unit 330 and extracts any area (Refer to the flow chart shown in FIG. 6) such as a text area, a photographic area, and a table area or the like in the input image (image data) (S501). Then, attributes such as a position, a size, and a type of the extracted area are extracted (S502).

In Embodiment 2, the area and the attributes extracted as described above are used as key information to be registered as well as key information for retrieval.

Figure 6:
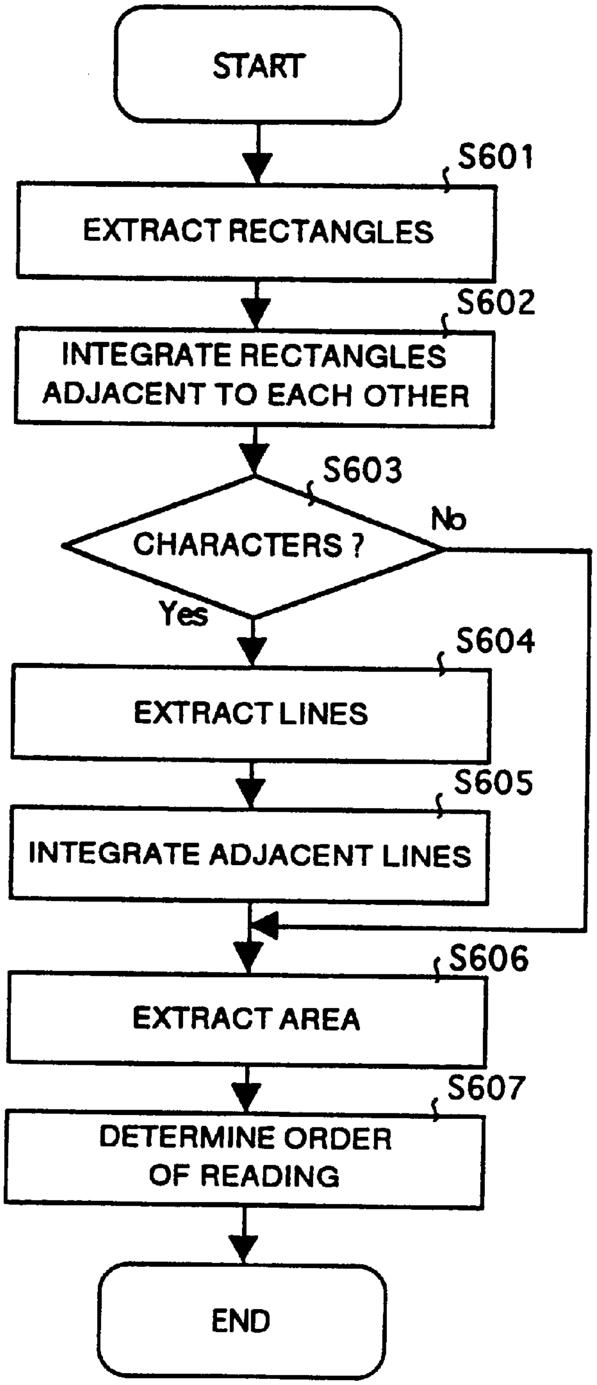
FIG. 6 is a flow chart showing the processing for extracting an area in the step of S501 according to FIG. 5.
Figure 7B:
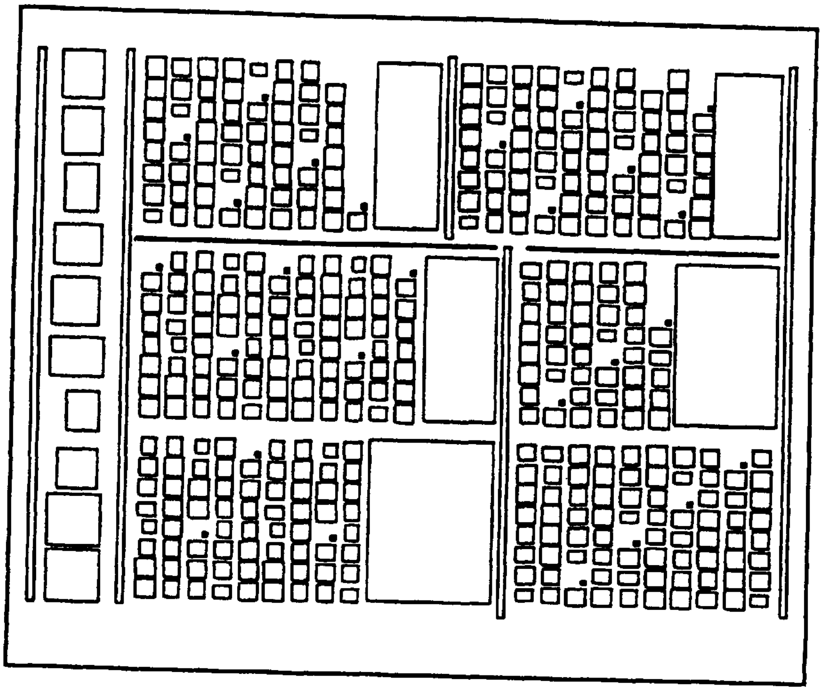
FIGS. 7A and 7B are explanatory views showing an example of the processing for extracting an area.
Figure 7A:
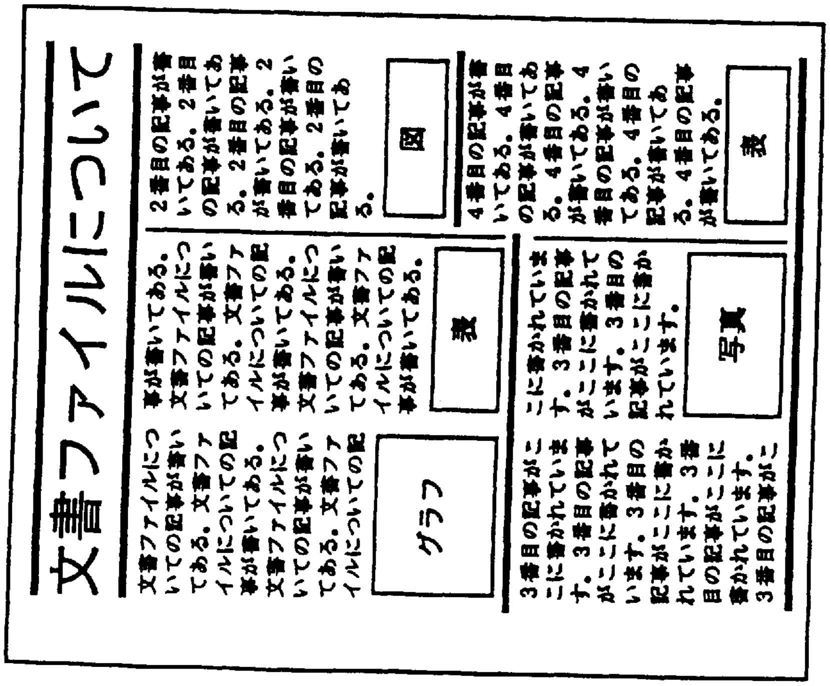

FIG. 6 shows a flow chart of the processing for extracting any area in step S501 in FIG. 5. Also, FIGS. 7A and 7B to FIG. 9 are explanatory views each showing an example of the processing for extracting any area. At first, the feature extracting section 410 receives an input image (image data) from the memory unit 330 and extracts minimum-sized rectangles (described as rectangle hereinafter) each covering an image with black pixels correlated to each other in the image data (S601). For instance, in a case where an input image is the image as shown in FIG. 7A, the extracted rectangles become as shown in FIG. 7B.

Figure 8B:
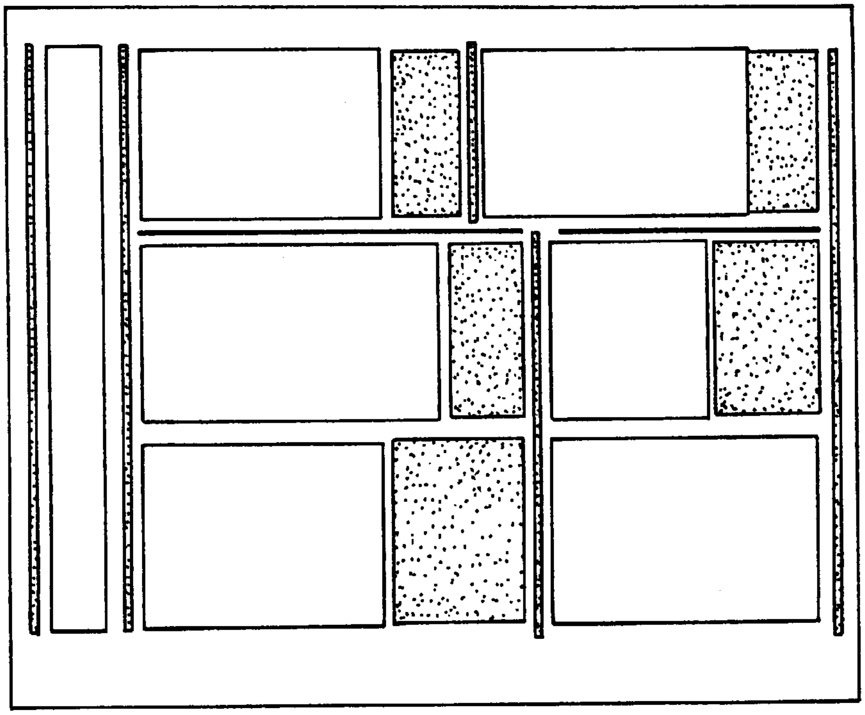
FIGS. 8A and 8B are explanatory views showing another example of the processing for extracting an area.
Figure 8A:
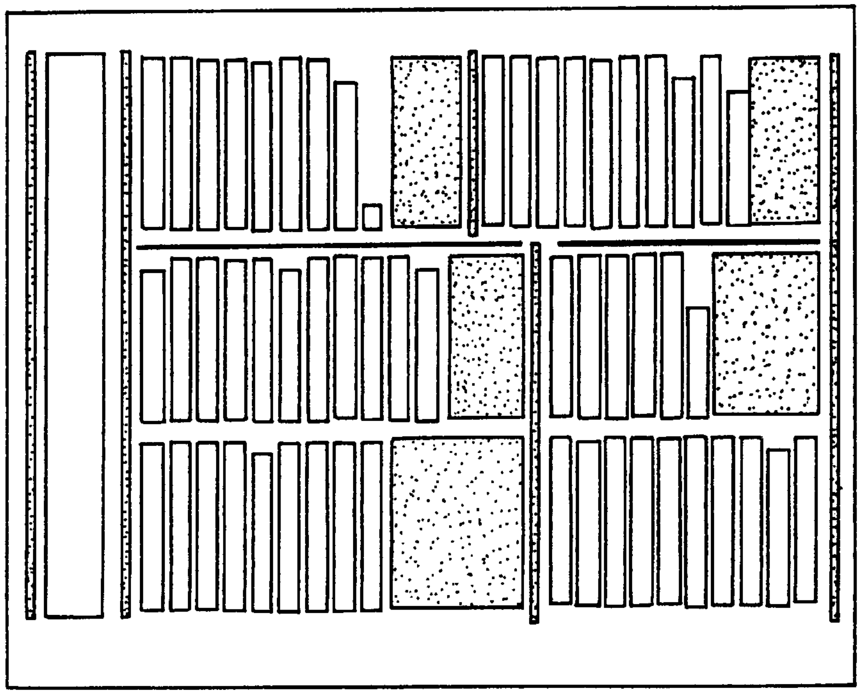

Then, the feature extracting section 410 integrates rectangles adjacent to each other and computes data for larger rectangles (S602). Herein, in a case where a size of any rectangle is within a prespecified area, the feature extracting section 410 makes determination as to whether the section indicates characters or not (S603), and in a case where it is determined that the section does not indicate characters, system control goes to step S606, while in a case where it is determined that the section indicates characters, the feature extracting section 410 extracts character lines each obtained by integrating the rectangles (S604). FIG. 8A shows a result of the processing for extracting the lines in the above step.

Further, in a case where lines adjacent to each other are within a prespecified area, the feature extracting section 410 integrates those adjacent lines (S605) and extracts character areas (S606). FIG. 8B shows a result of the processing for extracting character areas in the above step. Also, dotted sections each shown in FIGS. 8A and 8B, indicate areas except characters. Determination for the area can be made by determining a size of a rectangle or an area in which a line can not be extracted.

Figure 9:
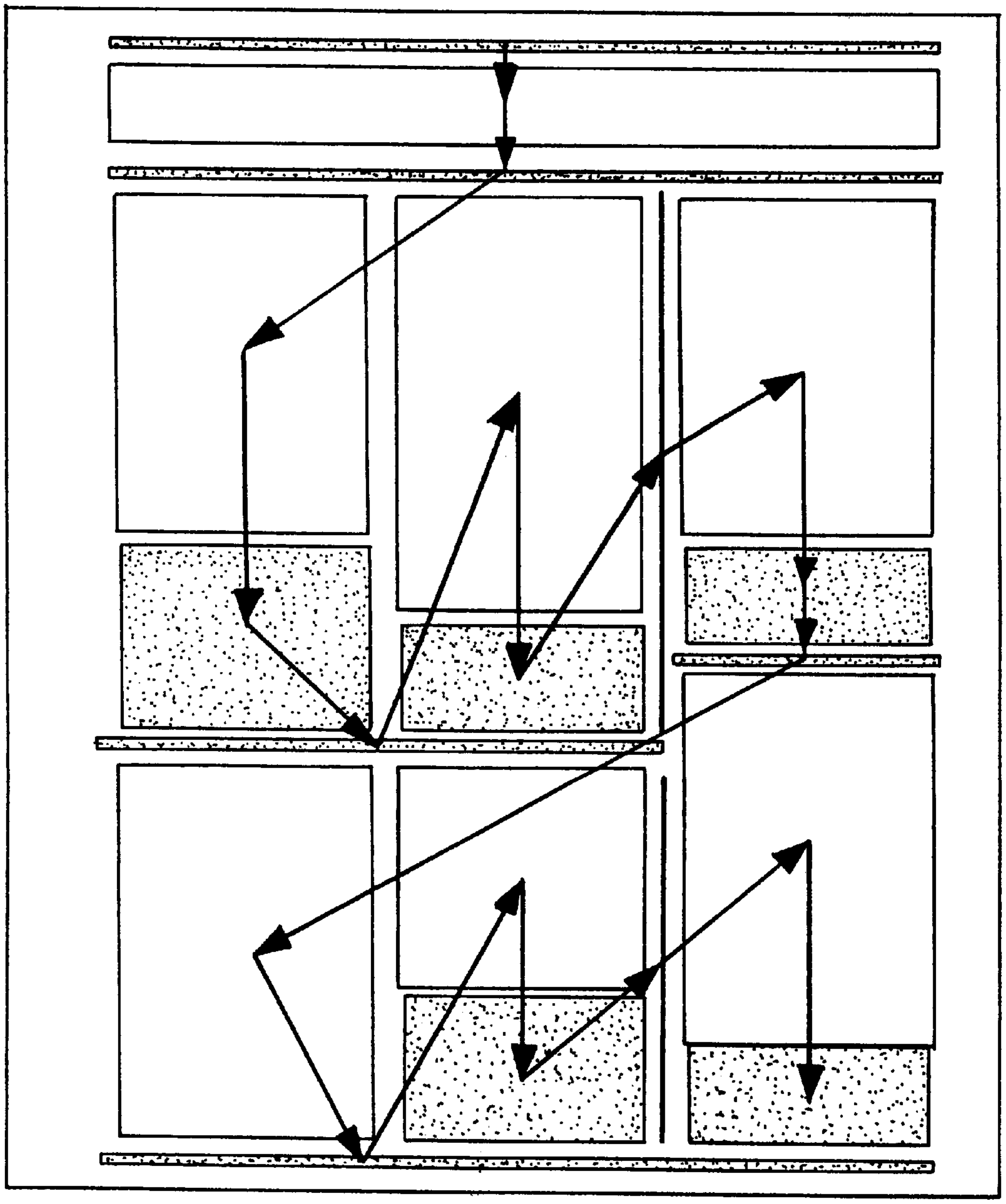
FIG. 9 is an explanatory view showing another example of the processing for extracting an area.

Finally, the feature extracting section 410 determines from which part of each extracted area reading is to be started (S607). The determination can be made by tracing the area from the upper side to the lower side thereof as well as from left to right thereof in a case where a direction of the line is lateral (writing in the lateral direction), and from the upper side to the lower side as well as from right to left in a case where a direction of the line is vertical (writing in the vertical direction). FIG. 9 shows a result of the determination described above.

Figure 10:
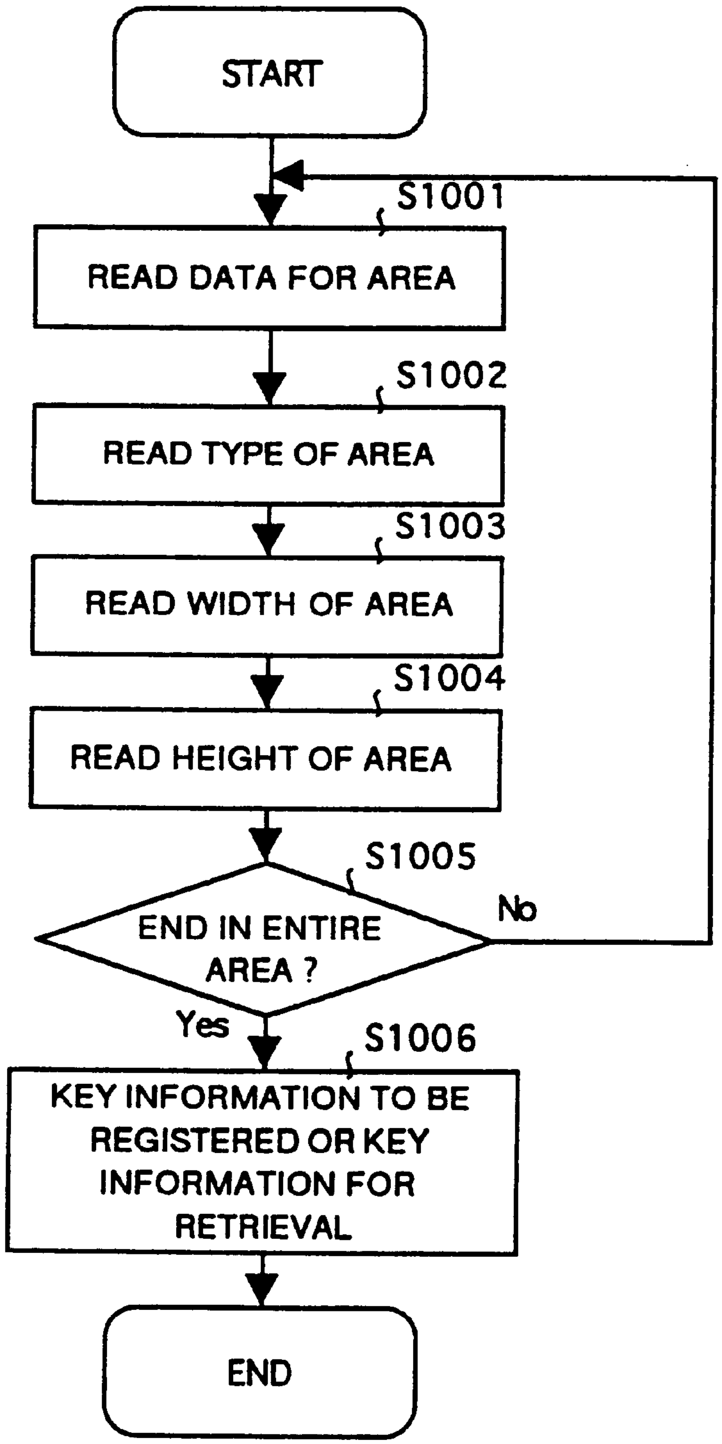
FIG. 10 is a flow chart showing the processing for extracting attributes of an image.

Next description is made for extraction of attributes of an image in step S502 shown in FIG. 5 with reference to FIG. 10. FIG. 10 is a flow chart of processing for extracting attributes of an image. At first, the feature extracting section 410 reads data for an entire area in the order of data for an area, a type, a width, and a height of the area from a result of extracting the area in the image (S1001 to S1005), and generates key information to be registered (or key information for retrieval) from the type, width, height of the area (S1006). By executing this operation over all of the areas, the data shown in FIG. 11 can be obtained. FIG. 11 is a view showing an example of the data obtained after the area extraction. Each of the areas obtained in the step is used for registration or retrieval of each image data as key information to be registered (or key information for retrieval) for this document image.

As described above, with Embodiment 2, by extracting an attribute of an extracted area such as a position, a size, a type thereof and making it as key information to be registered (or key information for retrieval), a difference between document forms can be identified. In other words, any image file can be identified. Also, a memory required for storing key information to be registered (or key information for retrieval) in the feature extracting section can be reduced, which makes it possible to accurately and speedily retrieve any image file therefrom.

As described above, with Embodiment 2, it is possible to retrieve any image file according to a difference between document forms as one of features, and it is especially effective in identification of image data each comprising multiple columns such as data in magazines or newspapers.

A digital copying machine (an image filing apparatus) according to Embodiment 3 has the same configuration as that according to Embodiment 1, in which the feature extracting section 410 extracts information for any area in read-out image data as features of a document.

Figure 12:
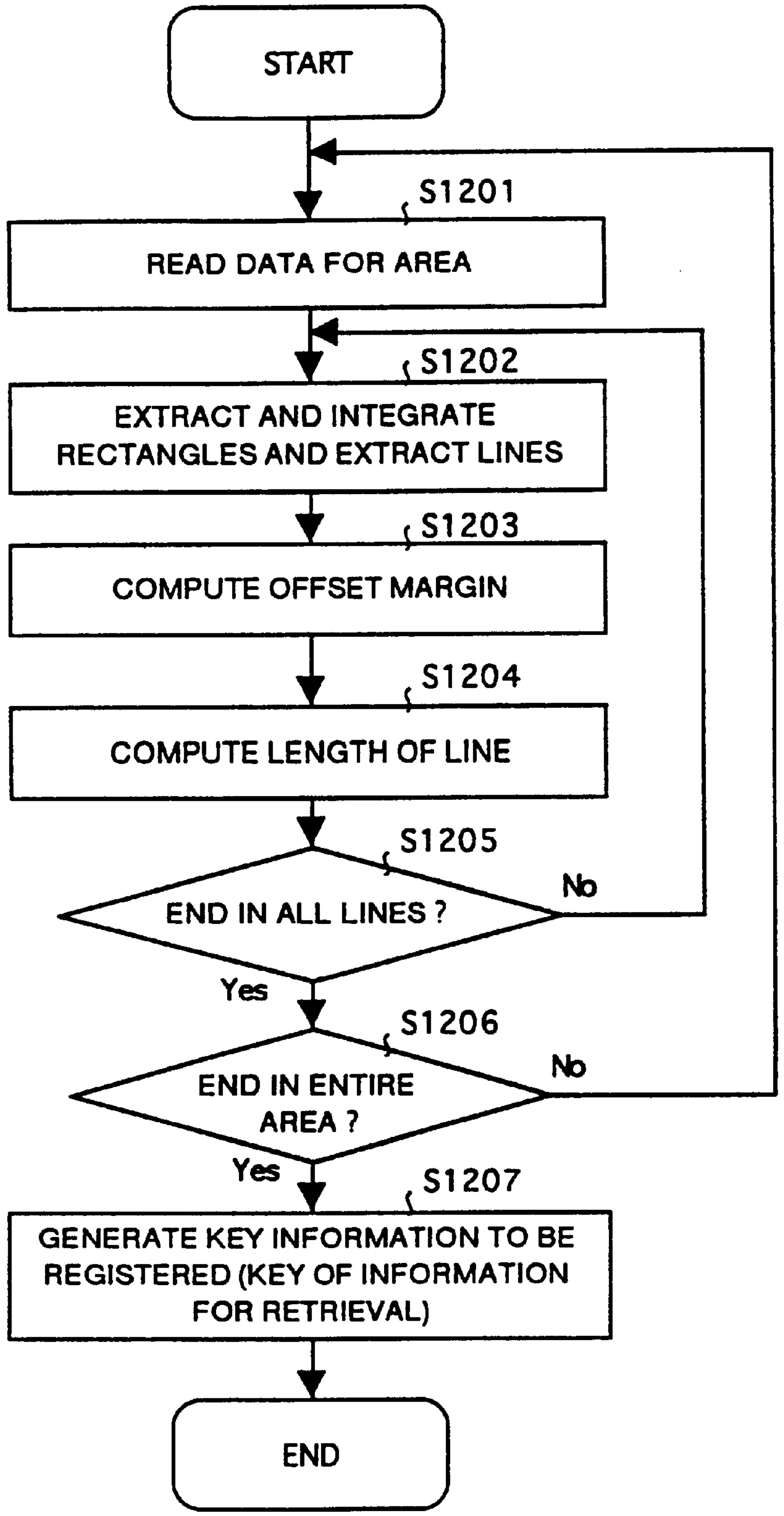
FIG. 12 is a flow chart showing processing in a feature extracting section according to Embodiment 3.
Figure 13B:
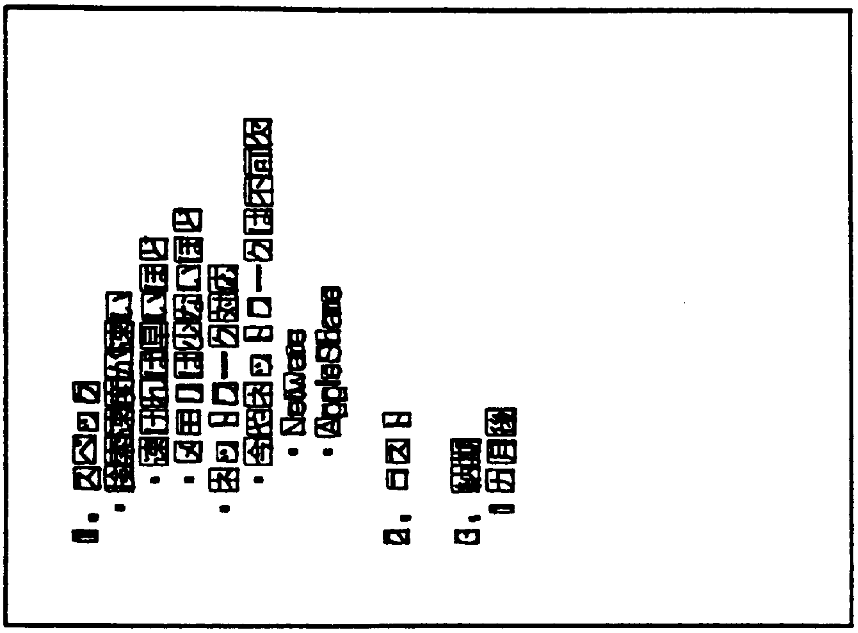
FIGS. 13A and 13B are explanatory views showing an example of processing in the feature extracting section according to Embodiment 3.
Figure 13A:
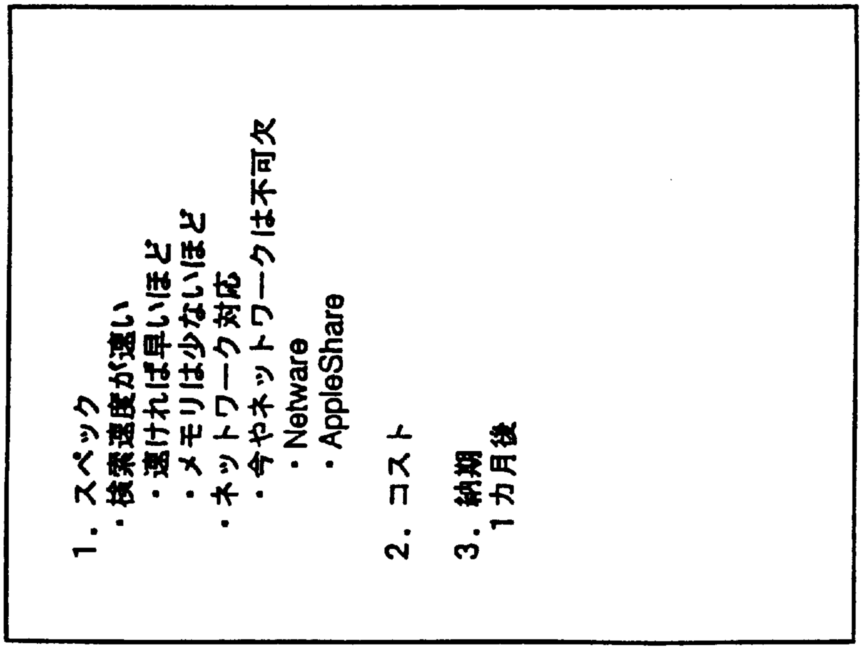
Figure 14:
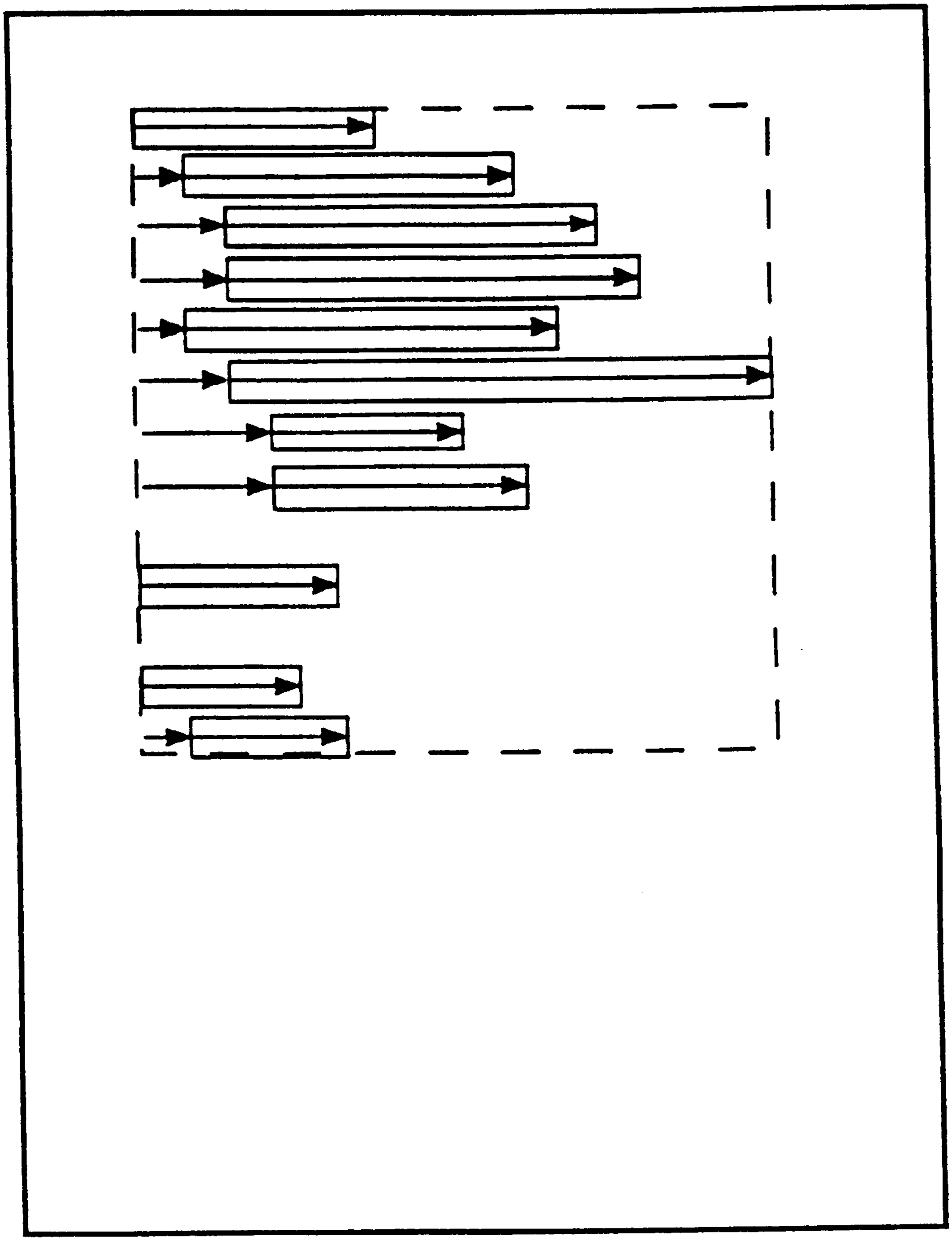
FIG. 14 is an explanatory view showing another example of processing in the feature extracting section according to Embodiment 3.

FIG. 12 is a flow chart of processing for extracting features according to Embodiment 3. Also, FIGS. 13A and 13B and FIG. 14 are explanatory views each showing an example of the processing in the feature extracting section 410. At first, the feature extracting section 410 receives an input image (image data) from the memory unit 330, reads data for areas therefrom (S1201), extracts rectangles in the image according to the data for areas, integrates the rectangles adjacent to each other according to the extracted rectangles, and extracts lines therefrom (S1202). Then, the feature extracting section 410 computes, an offset margin from the boundaries of the area at the starting position of each line, and a length of each line included in a text area according to the extracted lines by the feature extracting section 410 (S1203, S1204).

Herein, for instance, in a case where an image is of the document as shown in FIG. 13A, the entire document has a document area and there is only one area therein, so that key information to be registered which is unique in the method according to Embodiment 2 can not be prepared. For this reason, the feature extracting section 410 extracts rectangles in the image of the document as shown in FIG. 13B in Embodiment 3, further extracts lines by integrating rectangles adjacent to each other, and then computes an offset margin from the boundaries of the area at the starting position of each line as well as a length of each line included in the document area as shown in FIG. 14. FIG. 15 is a view showing an example of computation of an offset at the starting position of each line and a length of each line in the step.

Then, the feature extracting section 410 generates key information to be registered (key information for retrieval) (S1207) by executing the processing in steps S1202 to S1204 for all the lines therein (S1205) as well as the processing in steps S1201 to S1205 for all the areas therein (S1206).

As described above, with Embodiment 3, even in a case where the entire document has a text area and there is only one area therein as shown in FIG. 13A, an offset for starting each line and a length of each line are used as key information to be registered (key information for retrieval), so that any image file can be registered and retrieved. Namely, an image file can precisely be identified even in a text document with one column therein, which makes it possible to further improve the convenience in use.

Also, with Embodiment 3, in a case where forms such as documents each with no column therein are similar to each other, retrieval of an image file can be executed according to a starting position of each line and a length of each line as features of the document.

Next description is made for Embodiment 4. It should be noted that configuration of the apparatus according to Embodiment 4 is basically the same as that according to Embodiment 3, so that description is made for only different points therefrom with reference to the related drawings.

Figure 16:
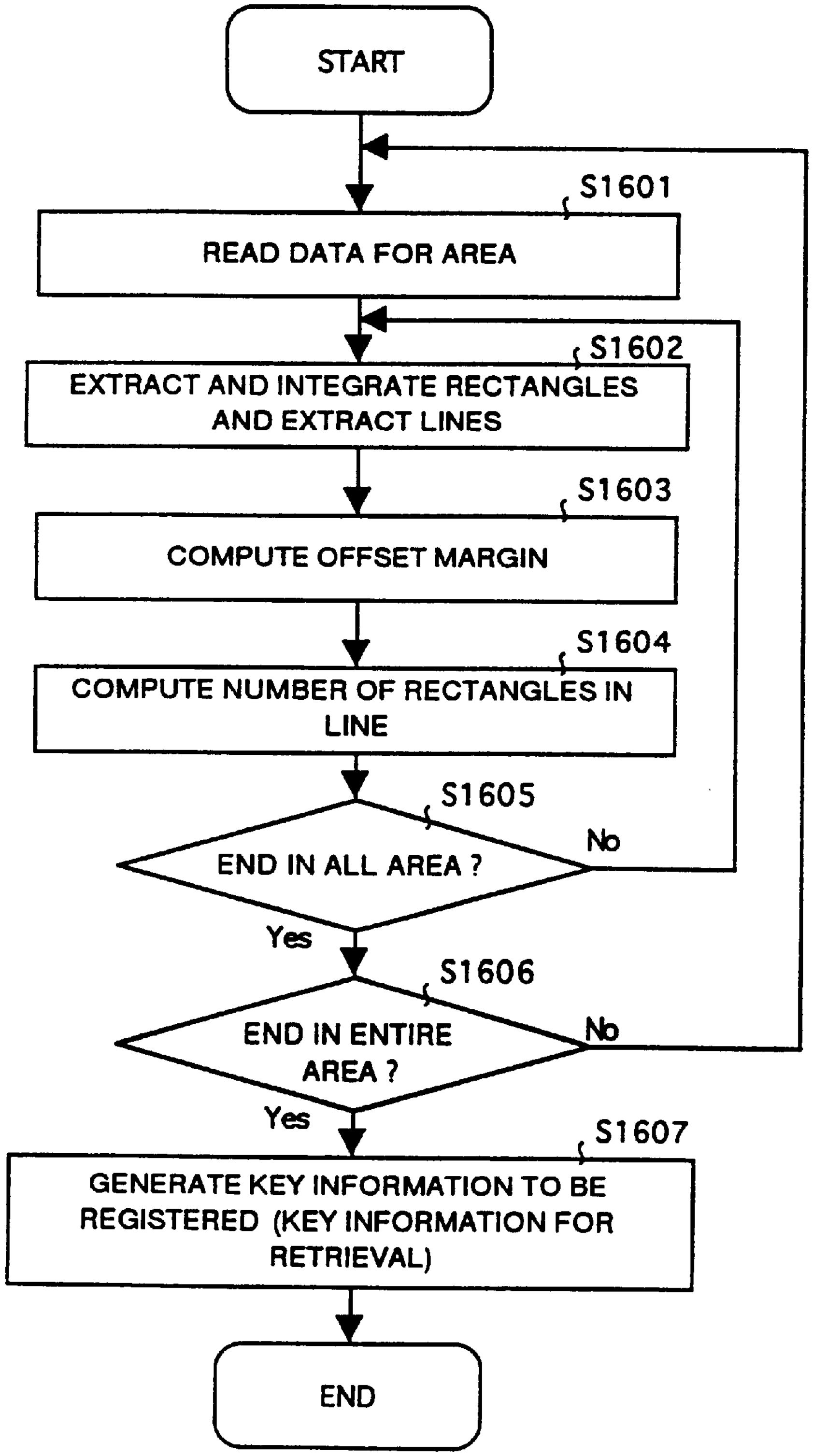
FIG. 16 is a flow chart showing processing in a feature extracting section according to Embodiment 4.
Figure 17:
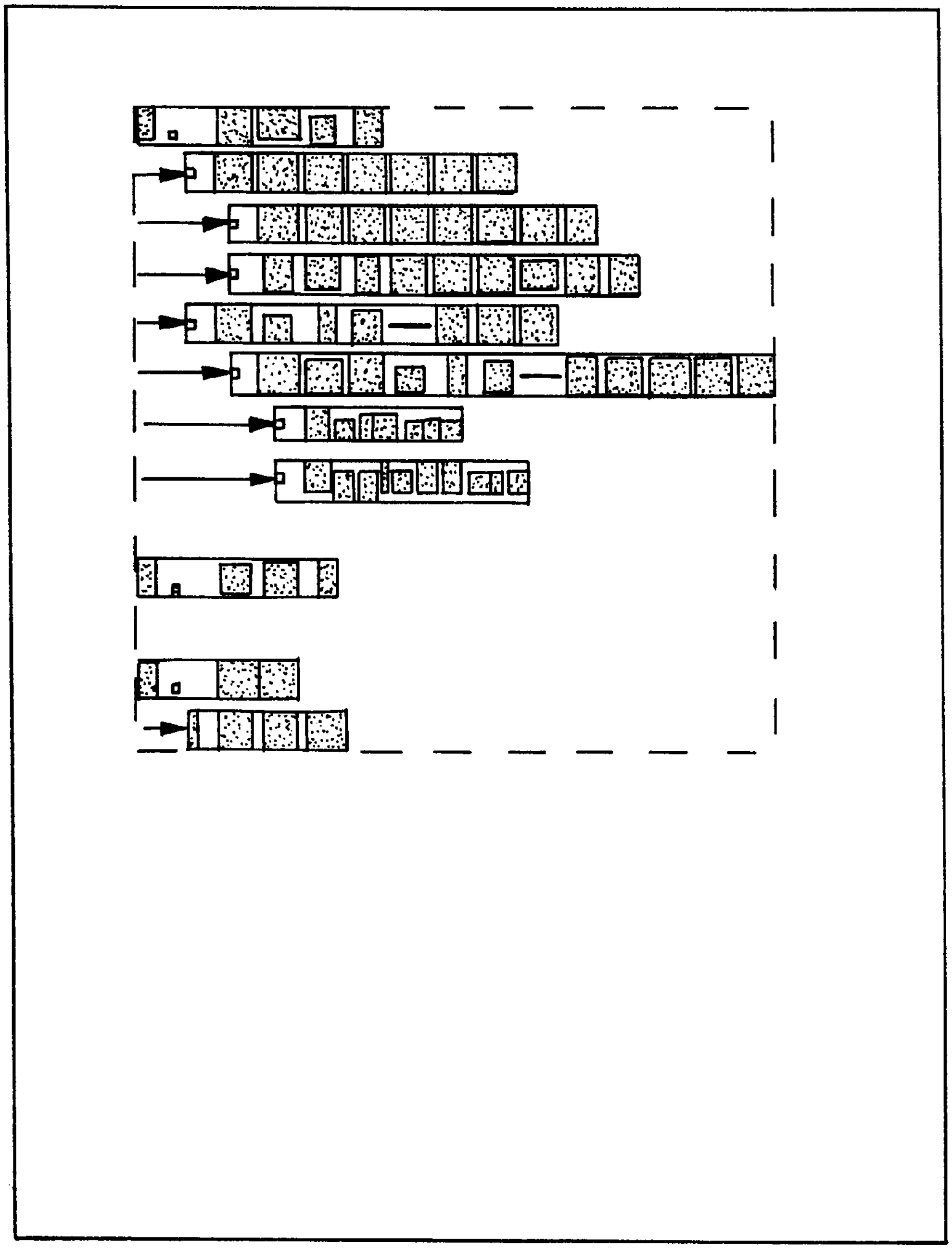
FIG. 17 is a flow chart showing an example of processing in the feature extracting section according to Embodiment 4.

FIG. 16 is a flow chart showing processing of the feature extracting section 410 according to Embodiment 4, and FIG. 17 is a view showing an example of the processing in the feature extracting section 410. In Embodiment 3, a document having not substantial difference between length of each line tends to be identified with low precision. For this reason, in Embodiment 4, a document is further identified according to the number of rectangles included in each line. As the number of rectangles indicates complexity of characters included in the line, the number is used for the identification.

Similarly to Embodiment 3, the feature extracting section 410 extracts rectangles and lines from the data (S1601 to S1602), and computes an offset margin from the boundaries of the area at the starting position of each line included in a character area as well as the number of rectangles included in the line (S1603 to S1604). FIG. 17 shows the rectangles obtained in the above step, and the dotted areas in FIG. 17 indicate rectangles. Also, FIG. 18 is a view showing an example of computing an offset for starting position of each line as well as the number of rectangles in each line from a result of the extraction as shown in FIG. 17.

Then, the feature extracting section 410 prepares key information to be registered (key information for retrieval) (S1607) by executing the operations in steps S1602 to S1604 for all the lines therein (S1605) as well as the operations in steps S1601 to S1605 for all the areas therein (S1606).

As described above, with Embodiment 4, even a document having no difference between length of each line therein can accurately be identified by retrieving data with some keyword obtained from the computed offset margin for each line and the number of rectangles in each line.

Namely, in a case where forms such as documents each having no column therein are similar to each other, and further in a case where a length of each line is similar to each other, even a document having no difference between the length of each line therein can accurately be identified because information for characters included in each line can be included in features of the document by regarding the number of rectangles included in the line as one of features thereof.

A digital copying machine (an image filing apparatus) according to Embodiment 5 extracts, when any image file is to be registered therein, a ratio of a width vs a height of each rectangle of characters in a text area from read-out image data as one of features of the document and stores therein the feature, and when any image file is to be retrieved, by extracting features of the document from the read-out image data and regarding the features as information for retrieval, any image file having the features of the document identical to the information for retrieval can be retrieved from previously registered image files. It should be noted that, the basic configuration of the digital copying machine according to Embodiment 5 is the same as that according to Embodiment 1, so that description is made herein for only different points therefrom.

In the configuration as described above, description is made for the operations in the order of 1) processing for registering an image file according to Embodiment 5, 2) processing for retrieving an image file according to Embodiment 5, 3) concrete operations in processing for feature extraction according to Embodiment 5, and 4) processing for registering/retrieving an image file in a case where any title or keyword is inputted.

Figure 19:
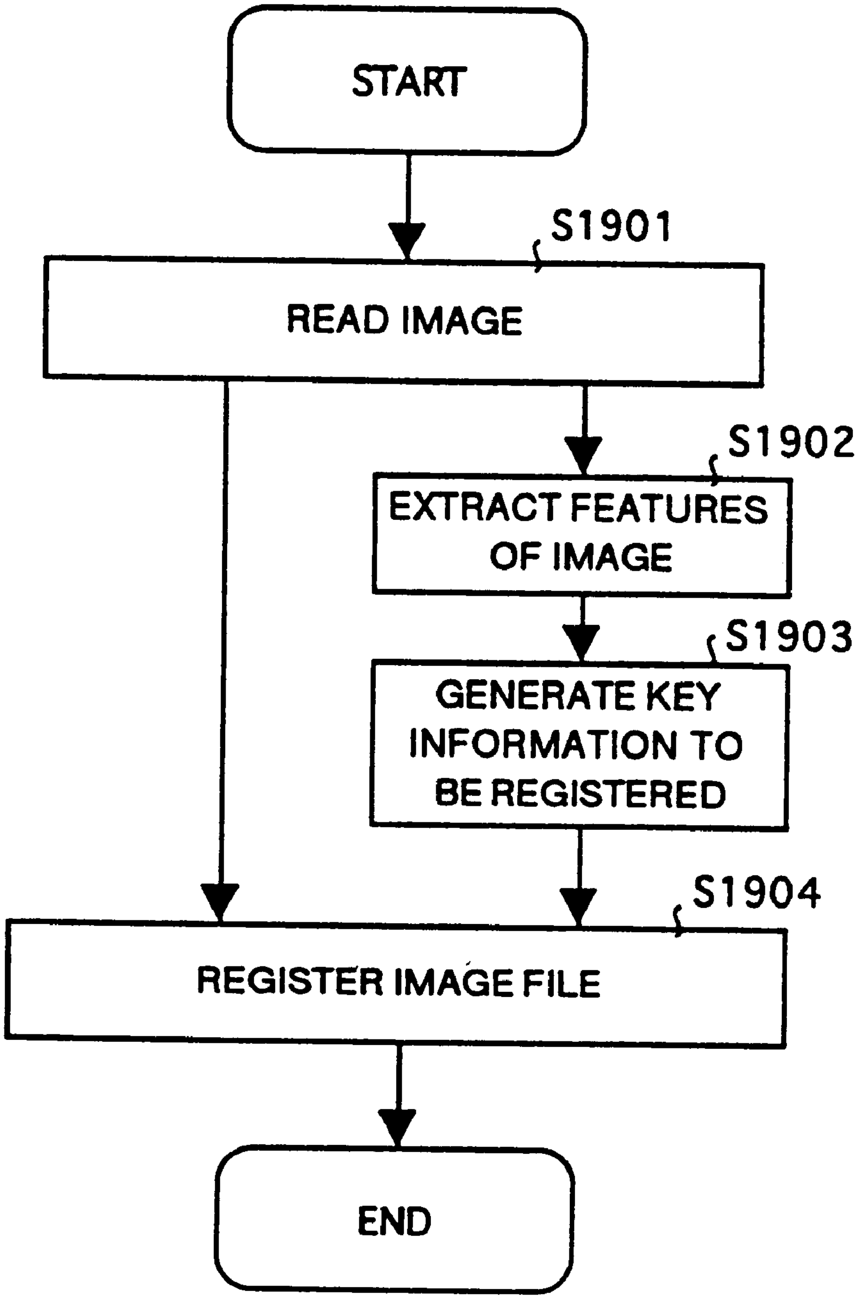
FIG. 19 is a flow chart showing the processing for registering an image file according to Embodiment 5.

FIG. 19 shows a flow chart of processing for registering an image file according to Embodiment 5, and at first, when an image registering mode for reading out a document through the operating section 310 and registering it as an image file is selected, the main control section 320 has the image scanner 100 read out an image of the document (image data) and the memory unit 330 store therein the image as an input image (S1901). On the other hand, the image file control section 430 receives a notice that the image registering mode has been selected from the main control section 320, has the feature extracting section 410 extract any features from the input image (image data) in the memory unit 330 (S1902), generates key information to be registered from the extracted features (S1903), then generates an image file with the generated key information to be registered correlated to the input image in the memory unit 330 to register the image file in the storage section 440 (S1904), whereby the processing is finished.

Figure 20:
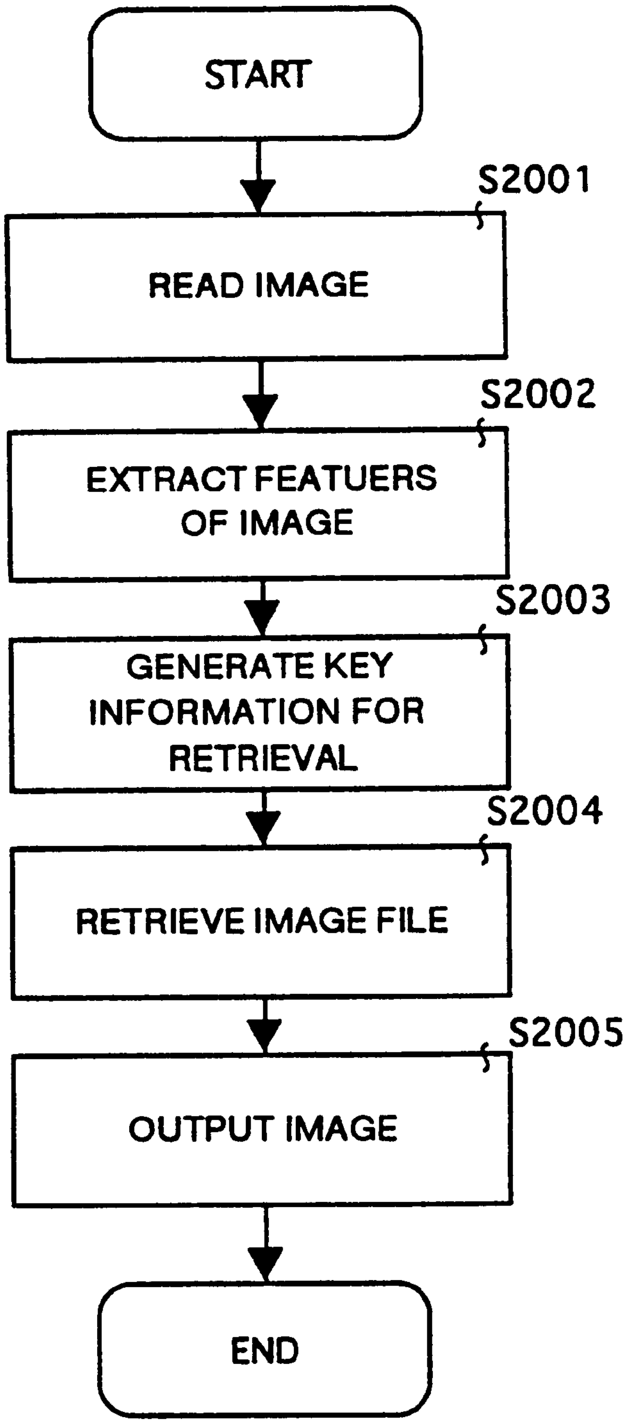
FIG. 20 is a flow chart showing the processing for retrieving an image file according to Embodiment 5.

FIG. 20 shows a flow chart of processing for retrieving an image file according to Embodiment 5, and at first, when an image retrieving mode for retrieving any registered image file through the operating section 310 is selected, the main control section has the image scanner 100 read out an image of a document and the memory unit 330 store therein the image as an input image (S2001). Then, the image file control section 430 receives a notice that the image registering mode has been selected from the main control section 320, the feature extracting section 410 extracts any features from the input image (image data) in the memory unit 330 (S2002), then the image retrieving section 420 generates key information for retrieval from the extracted features (S2003), and retrieves any image file having the key information to be registered identical to the key information for retrieval from the storage section 440 (S2004). When the image file control section 430 sends out an appropriate image file as an output image to the memory unit 330, the image file is sent to the laser printer 200 through the memory unit 330 and outputted to recording paper (S2005). It should be noted that features of a document (image data) can be obtained by using, for instance, a distribution of black pixels in the image or the number of pixels in each area as a unit or the like.

Figure 21:
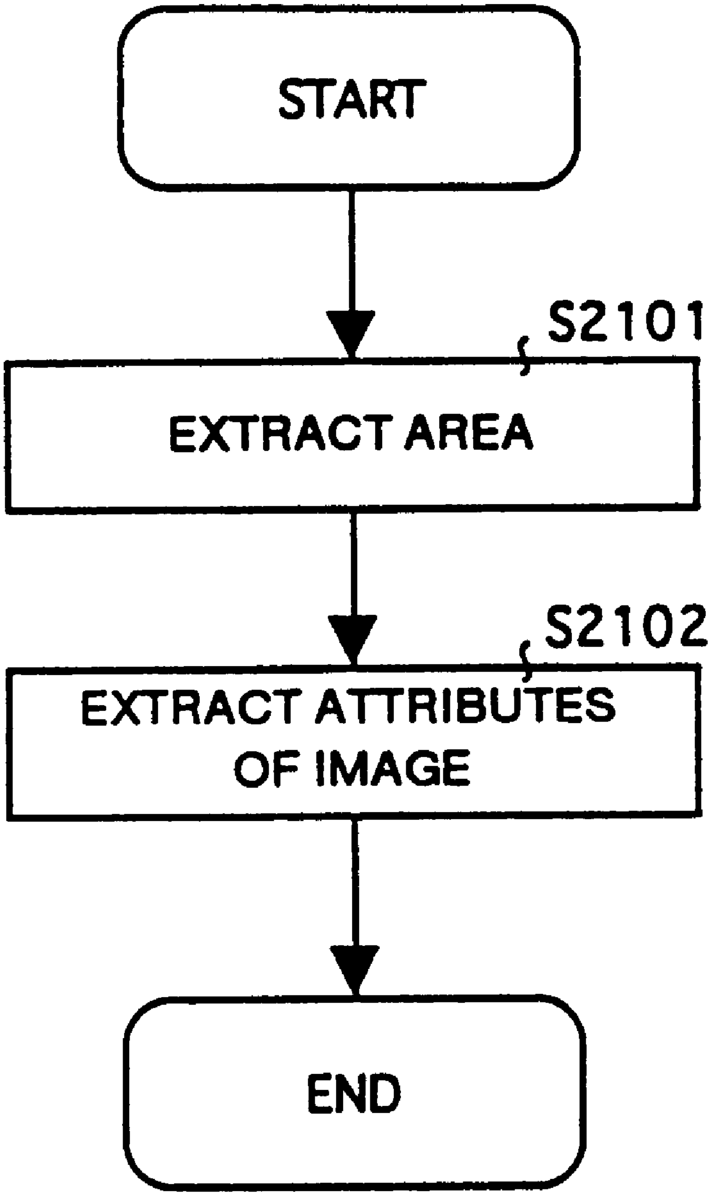
FIG. 21 is a flow chart showing the processing for extracting features according to Embodiment 5.

FIG. 21 is a flow chart of processing for extracting features according to Embodiment 5. At first, the feature extracting section 410 receives an input image from the memory unit 330 and extracts any area (Refer to the flow chart shown in FIG. 6) such as a text area, a photographic area, and a table area or the like in the input image (image data) (S2101). Then, attributes of the image such as a position, a size, and a type of the extracted area are extracted (S2102).

In Embodiment 5, the area and the attributes extracted as described above are used as key information to be registered as well as key information for retrieval.

Figure 22:
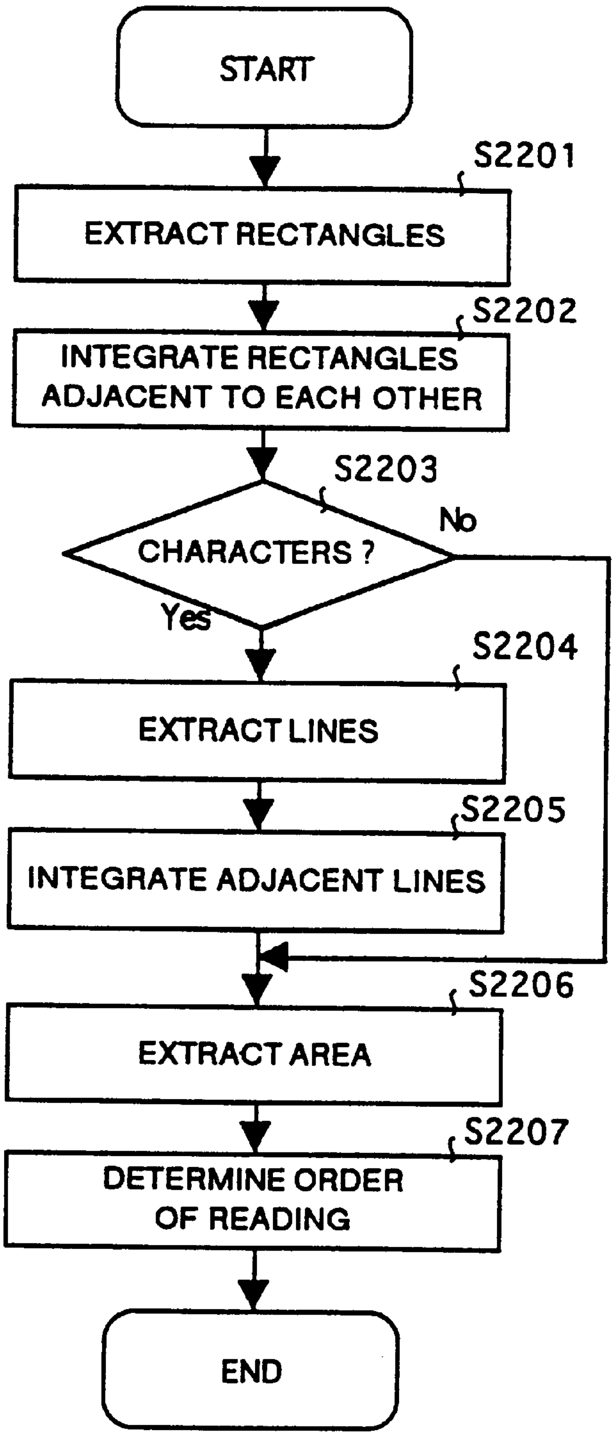
FIG. 22 is a flow chart showing the processing for extracting an area in the step of S2101 according to FIG. 21.
Figure 23B:
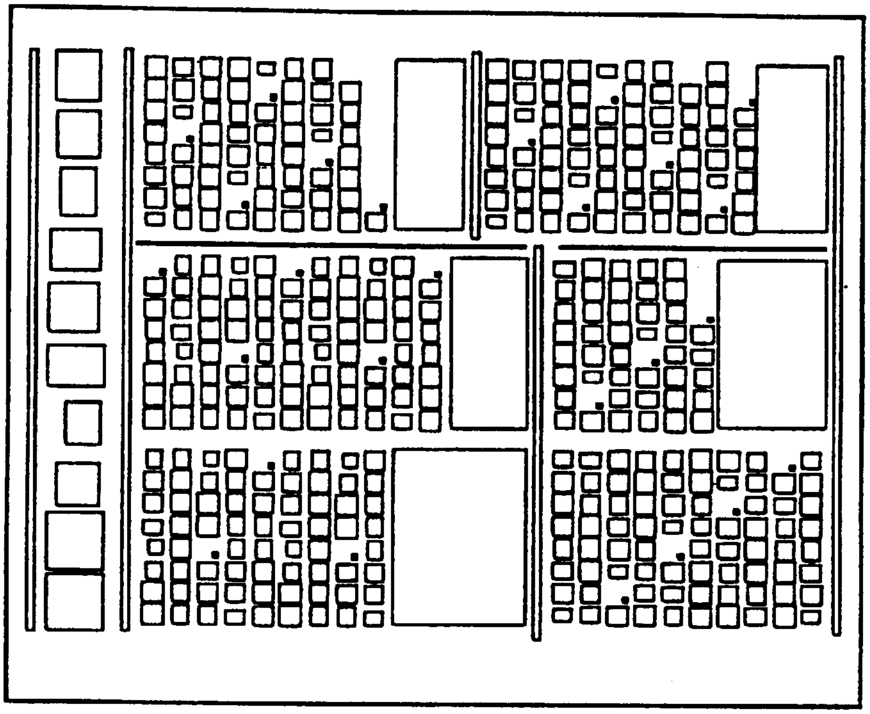
FIGS. 23A and 23B are explanatory views showing an example of the processing of extracting an area according to Embodiment 5.
Figure 23A:
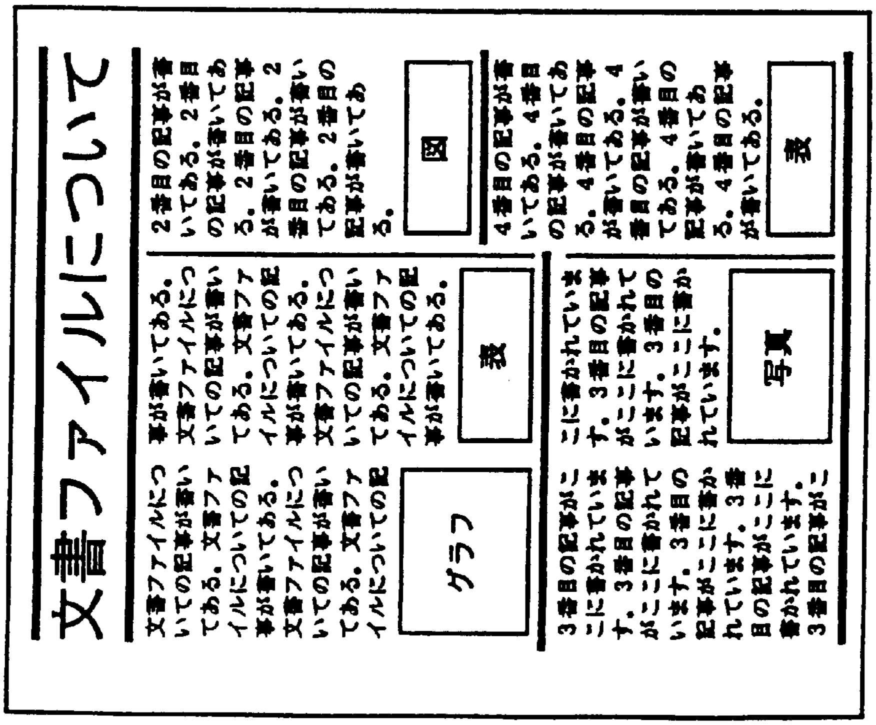

FIG. 22 shows a flow chart of the processing for extracting any area in step S2101 shown in FIG. 21. Also, FIGS. 23A and 23B to FIG. 25 are explanatory views each showing an example of the processing for extracting any area. At first, the feature extracting section 410 receives an input image (image data) from the memory unit 330 and extracts minimum-sized rectangles (described as rectangle hereinafter) each covering an image with black pixels correlated to each other in the image data (S2201). For instance, in a case where an input image is the image as shown in FIG. 23A, the extracted rectangles become as shown in FIG. 23B.

Figure 24B:
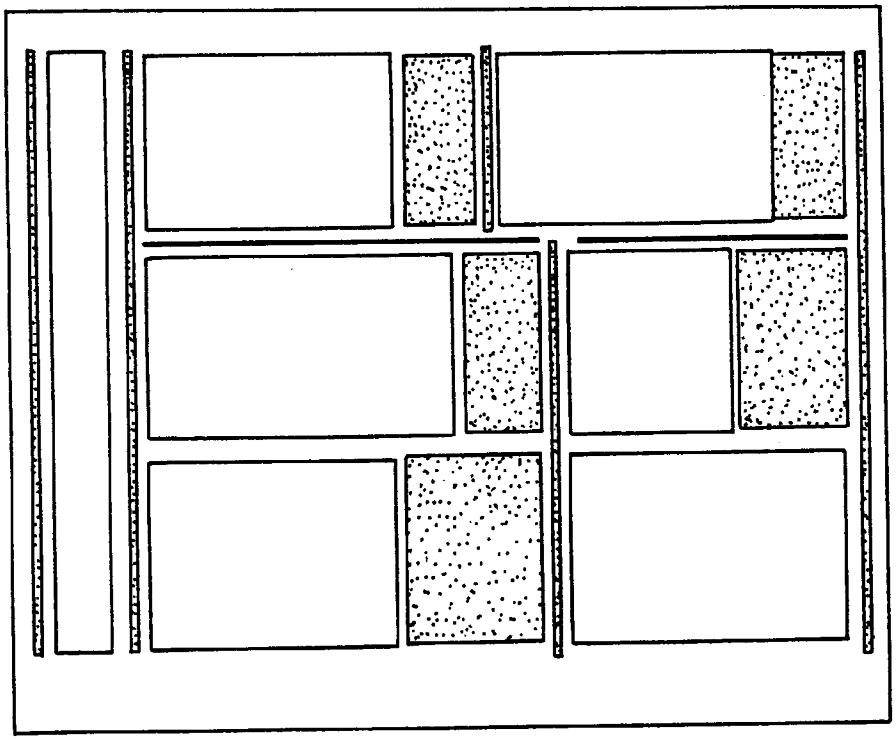
FIGS. 24A and 24B are explanatory views showing another example of the processing for extracting an area according to Embodiment 5.
Figure 24A:
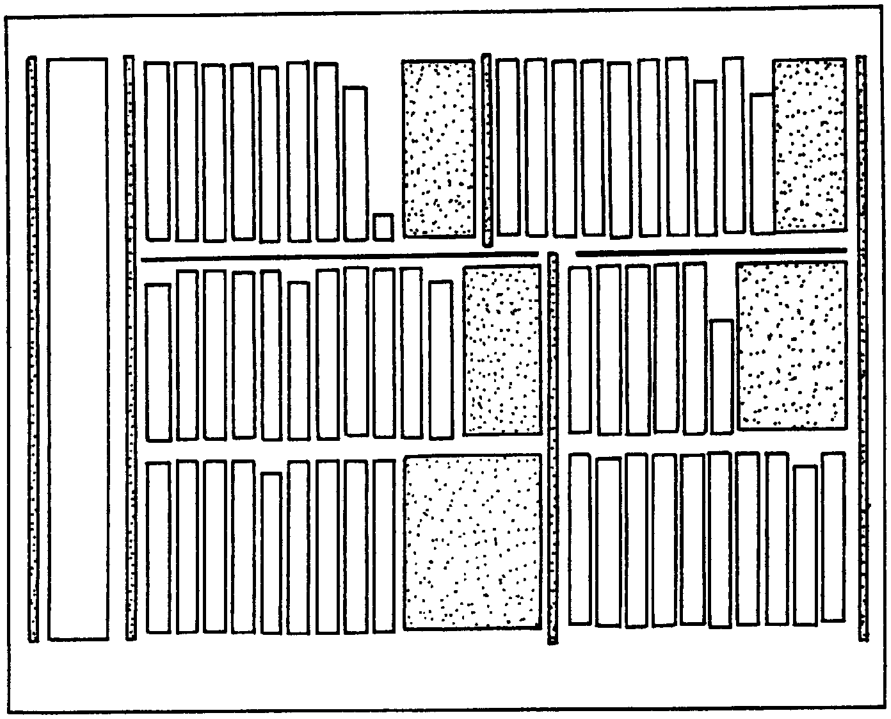

Then, the feature extracting section 410 integrates rectangles adjacent to each other and computes data for larger rectangles (S2202). Herein, in a case where a size of any rectangle is within a prespecified area, the feature extracting section 410 makes determination as to whether the section indicates characters or not (S2203), and in a case where it is determined that the section does not indicate characters, system control goes to step S2206, while in a case where it is determined that the section indicates characters, the feature extracting section 410 extracts character lines each obtained by integrating the rectangles (S2204). FIG. 24A shows a result of extracting the lines in the above step.

Further, in a case where lines adjacent to each other are within a prespecified area, the feature extracting section 410 integrates those adjacent lines (S2205) and extracts character areas (S2206). FIG. 24A shows a result of extracting character areas in the above step. Also, dotted sections each shown in FIGS. 24A and 24B indicate areas except characters. Determination for the area can be made by determining a size of a rectangle or an area in which a line can not be extracted.

Figure 25:
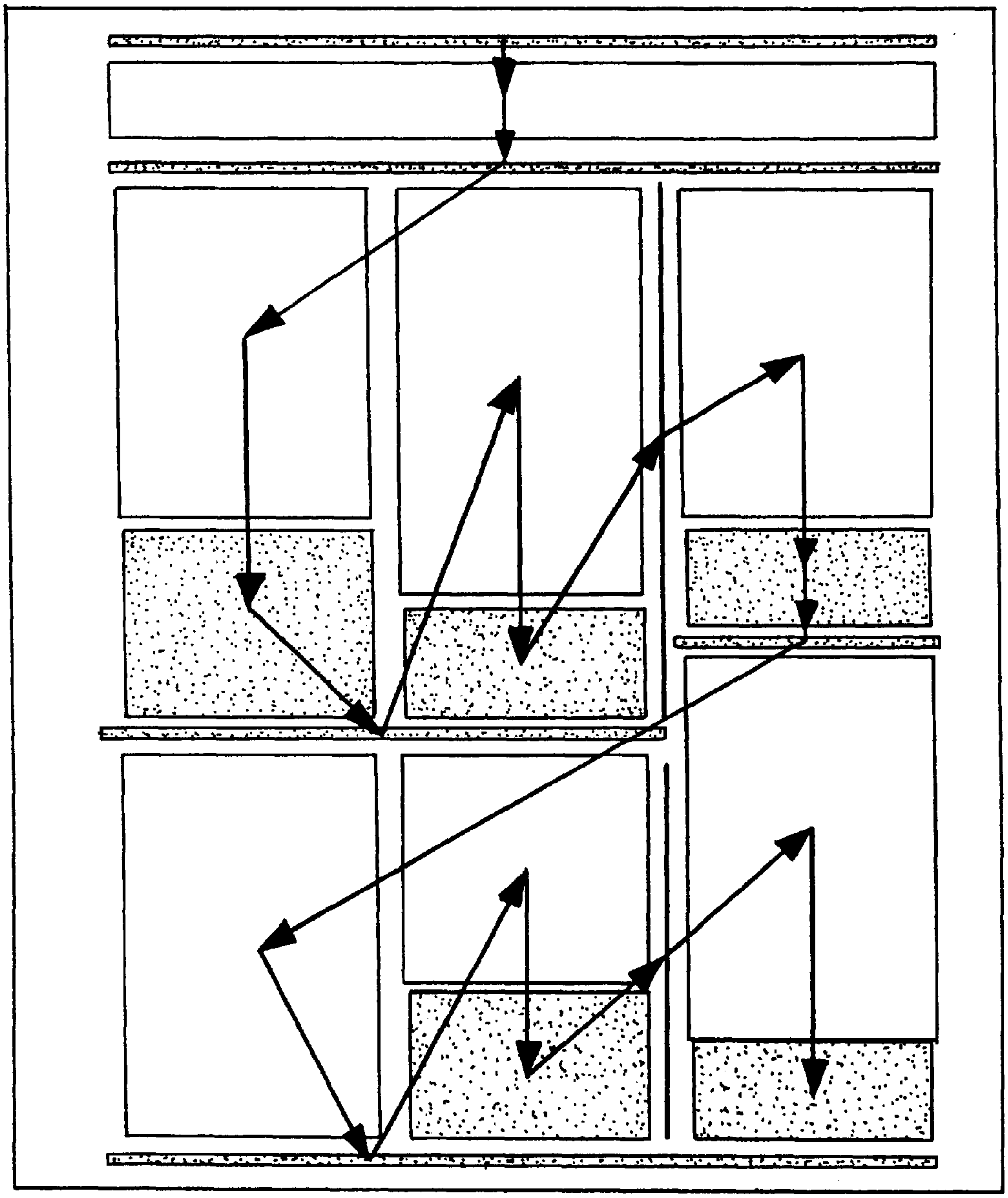
FIG. 25 is an explanatory view showing another example of the processing for extracting an area according to Embodiment 5.

Finally, the feature extracting section 410 determines from which part of each extracted area reading is to be started (S2207). The determination can be made by tracing the area from the upper side to the lower side thereof as well as from left to right thereof in a case where a direction of the line is lateral (writing in the lateral direction), and from the upper side to the lower side as well as from right to left in a case where a direction of the line is vertical (writing in the vertical direction). FIG. 25 shows a result of the determination described above.

Figure 26:
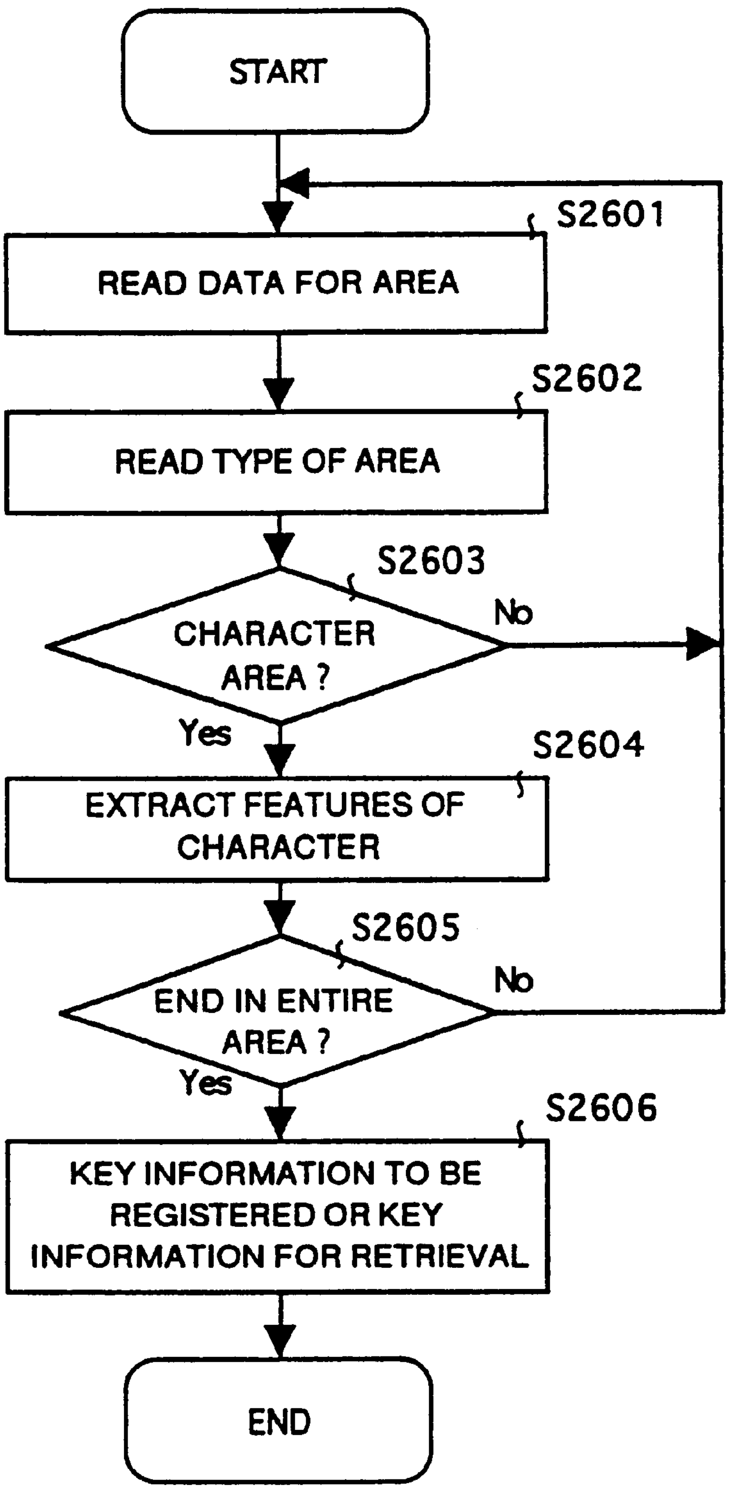
FIG. 26 is a flow chart showing the processing of extracting attributes of an image in the feature extracting section according to Embodiment 5.

Next description is made for extraction of an image attribute in step S2102 shown in FIG. 21 with reference to FIG. 26. FIG. 26 is a flow chart of processing for extracting an image attribute. At first, the feature extracting section 410 reads data in the order of data for an area and a type of the area from a result of extracting the area in the document image (S2601 to S2602). It should be noted that FIG. 27 shows an example of a result of extracting areas of the document image obtained in steps S2601 to S2602. FIG. 27 is a view showing an example of determination of each area for each of which is read according to the order thereof.

Then the feature extracting section 410 makes determination as to whether the type of area read in step S2602 is a character area or not (S2603), and in a case where it is determined that the type thereof is not a character area, system control returns to step S2601.

On the other hand, in step S2603, in a case where it is determined that the type is a character area, the feature extracting section 410 extracts features of characters from the area determined (S2604: Refer to FIGS. 28A to 28D), prepares key information to be registered (or key information for retrieval) from the extracted features of the characters (S2606) when the processing in steps S2601 to 2604 is executed for all the area (S2605), and terminates the processing. The key information to be registered (or key information for retrieval) for the document image is used for registration or retrieval thereof.

Figure 28A:
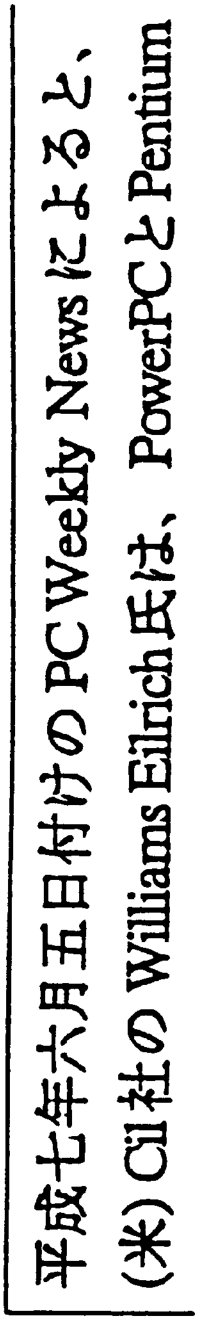
FIGS. 28A to 28D are explanatory views showing an example of the processing for extracting features of characters in the feature extracting section according to Embodiment 5.
Figure 28B:
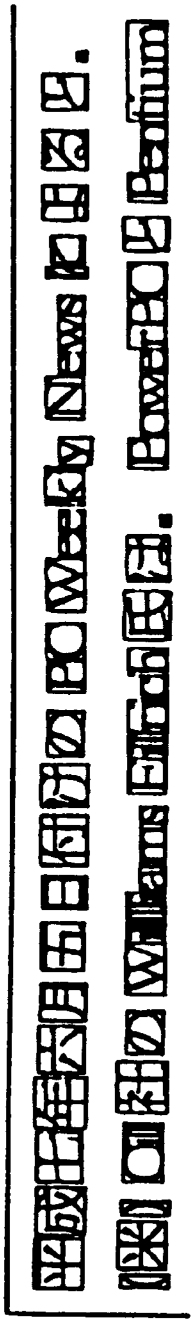
Figure 28C:
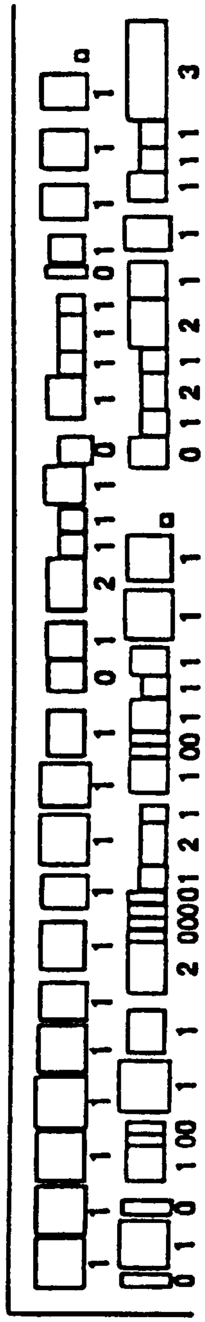

Next concrete description is made for the processing for extraction features of characters shown in step 2604 in FIG. 26 with reference to FIGS. 28A to 28D and FIG. 29. For instance, in a text with Japanese language and English language mixed therein in the document image as shown in FIG. 28A, when rectangles for the characters are extracted as shown in FIG. 28B, it is understood that there are some difference in a character width as well as a character pitch between the sections in Japanese and those in English.

Figure 29:
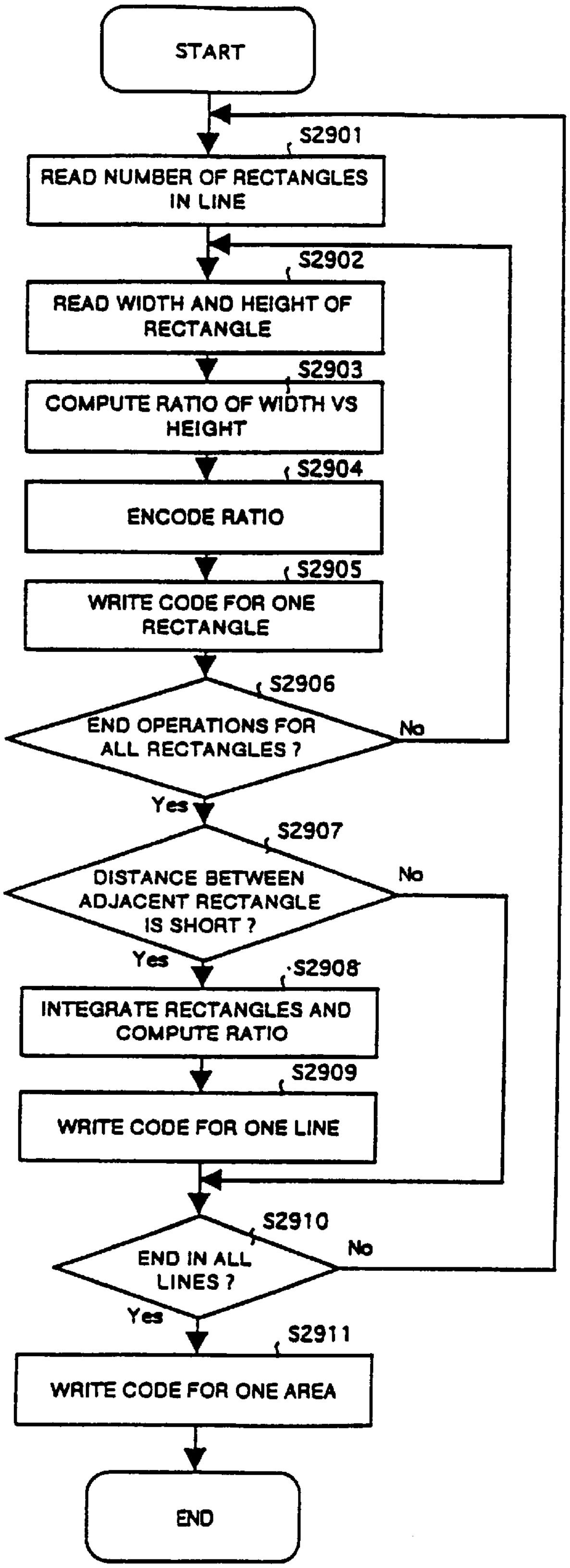
FIG. 29 is a flow chart showing the processing for extracting features of characters in the feature extracting section according to Embodiment 5.

Description is made for the processing of extracting features (character features) of characters in the image of the document in the step with reference to FIG. 29. FIG. 29 is a flow chart showing the processing for extracting character features in the feature extracting section 410.

At first, the feature extracting section 410 reads the number of rectangles in each line with such characters as shown in FIG. 28B from a result obtained when the area has been extracted (S2901), and reads a width and a height of each of the rectangles (S2902).

Then, the feature extracting section 410 computes a ratio of a width vs a height in one of the read rectangles (a width/a height are described as a ratio in Embodiment 5 ) (S2903), encodes the ratio base on a prespecified threshold value (S2904), and writes codes for one rectangle (S2905). The written codes in this step are indicated as numerals shown in FIG. 28C. It should be noted that, in Embodiment 5, code is indicated in a range from 0 to 3 and is expressed by 2 bits.

Then, the feature extracting section 410 executes the operations in steps S2902 to S2905 for all of the rectangles (S2906). In this step, determination is made as to whether rectangles of characters adjacent to each other are within a prespecified distance (namely a distance between the adjacent rectangles is short) or not (S2907), and in a case where it is determined that the distance is short, the feature extracting section 410 computes each ratio after the close rectangles are integrated (S2908) and writes the code for one line therein (S2909).

Figure 28D:
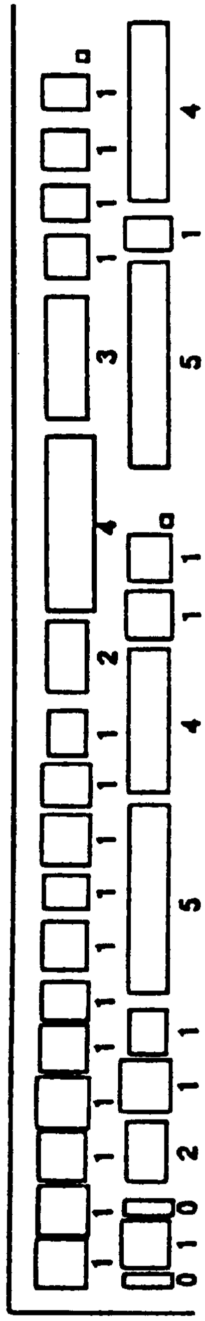
Figure 30:
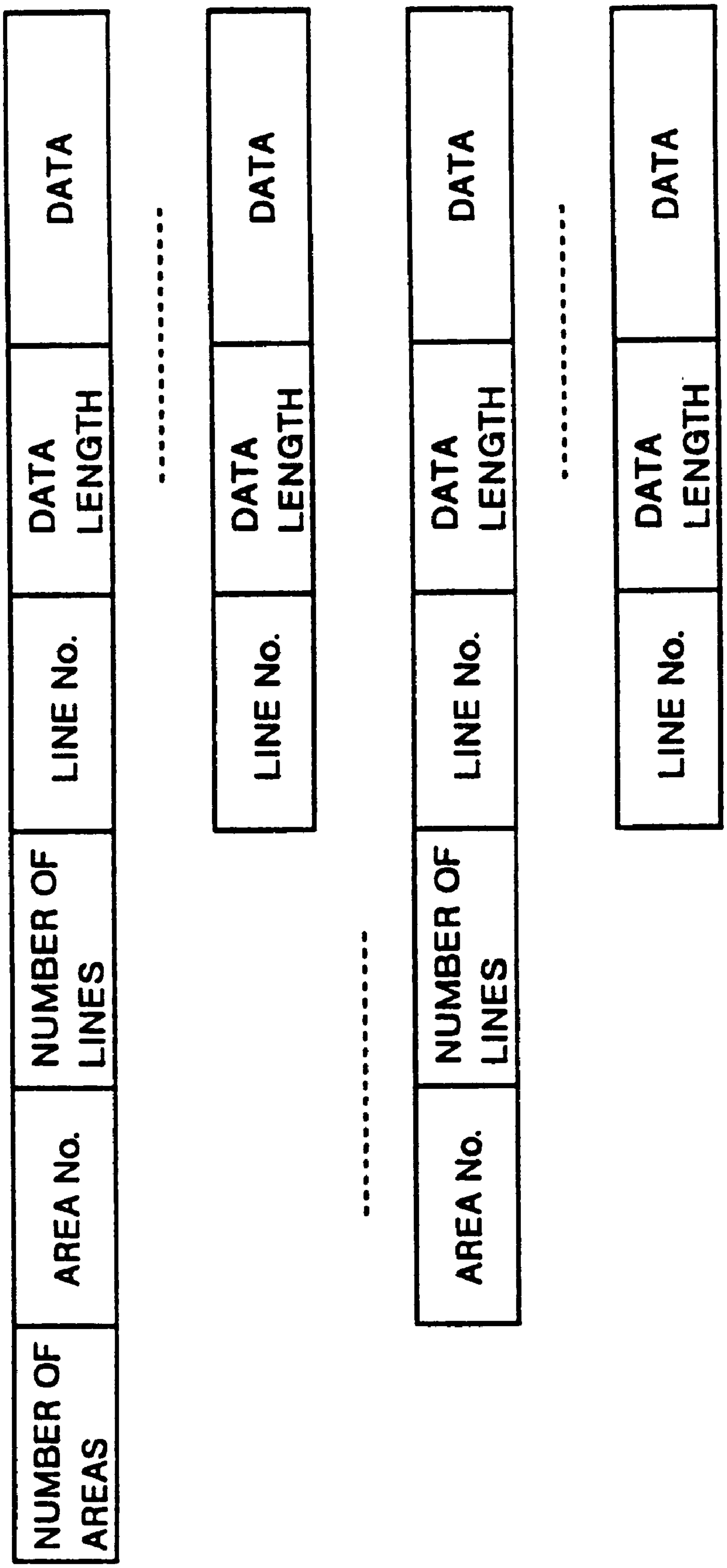
FIG. 30 is an explanatory view showing an example of a keyword which is coded data according to Embodiment 5.

It should be noted that FIG. 28D shows, in a case where character rectangles adjacent to each other are present within a prespecified distance, a result of computing each ratio and encoding them after the rectangles are integrated. In this case, a length of each code may become longer, but the number of rectangles becomes less, so that, in a case where there are many sections in English in a line, a quantity of data to be stored is made less. The feature extracting section 410 executes the processing as described above for all of the lines in one area and writes encoded data therein. FIG. 30 shows an example of encoded data.

Then the feature extracting section 410 executes the processing in steps S2901 to S2909 for all of the lines (S2910), writes therein codes for one area (S2911), and terminates the processing. It should be noted that the codes obtained in the step are registered therein as key information to be registered and are used when any image file is to be retrieved.

Description is made for processing for registering/retrieving an image file in a case where any title or keyword is inputted. It is assumed herein that the digital is copying machine according to Embodiment 5 has the configuration in which any title or keyword can be specified according to selection by a user through the operating section 310 when any image file is to be registered. However, specification of a title or a keyword is not always necessary, and for this reason, in a case where any title or keyword is not specified, either 1) the processing for registering an image file according to Embodiment 5 or 2) the processing for retrieving an image file according to Embodiment 5 each described above is automatically executed.

For instance, in a case where an image file is to be registered, if any title or keyword is inputted through the operating section 310, the image file control section 430 generates an image file with the title or keyword correlated to the prepared key information to be registered and the input image (namely the read-out image data) in the memory unit 330 to store the image file in the storage section 440.

In a case where an image file is to be retrieved, if any title or keyword is inputted through the operating section 310, the image retrieving section 420 retrieves any image file having an appropriate title or keyword from the image files stored in the storage section 440 by using the inputted title or keyword and outputs the image file. However, it is needless to say that the retrieval is impossible in a case where any title or keyword corresponding to any image file to be retrieved is not previously registered in the storage section. In this case, key information for retrieval is generated from the input image read from the document in the method indicated in 2) the processing for retrieving an image file according to Embodiment 5, and the image file is retrieved with the key information for retrieval.

As described above, with Embodiment 5, even any keyword is not inputted when any image file is to be registered in the storage section 440, key information to be registered is generated by automatically extracting features in the image of a document, which makes it easier to operate registering work for an image file. When an image file is to be retrieved, the operation for retrieval is also easy because key information for retrieval is generated by automatically extracting features in the image of a document as described above and an appropriate image file is retrieved by using the key information for retrieval.

Also, the feature extracting section 410 extracts attributes of the extracted area such as a position, a size, and a type thereof, and by using the attribute as key information to be registered (key information for retrieval), it is possible to reduce a memory required for storing therein the key information to be registered (key information for retrieval) used for identification of a difference between forms, which makes it possible to accurately and speedily retrieve the difference.

Further, even a document image is the text with Japanese language and English language mixed therein as shown in FIG. 28A, an image file in the similar layout to that of the text can be retrieved based on arrangement of full size, half size, and English characters because the extracted areas are encoded.

Also, even a document image is a text with Japanese language and English language mixed therein, extracted areas are encoded and rectangles are also encoded by integrating the rectangles in a case where the rectangles are present within a prespecified distance, so that the number of rectangles are reduced, and data to be stored in the memory becomes less in a case where there are many sections in English in the area, so that a memory required for storing key information to be registered (key information for retrieval) therein can be further reduced.

A digital copying machine according to Embodiment 6 (an image filing apparatus) has the configuration similar to that of a copying machine according to Embodiment 5, and generates key information to be registered (and key information for retrieval) by using position of smaller rectangles such as punctuation marks included in a document image.

Figure 31:
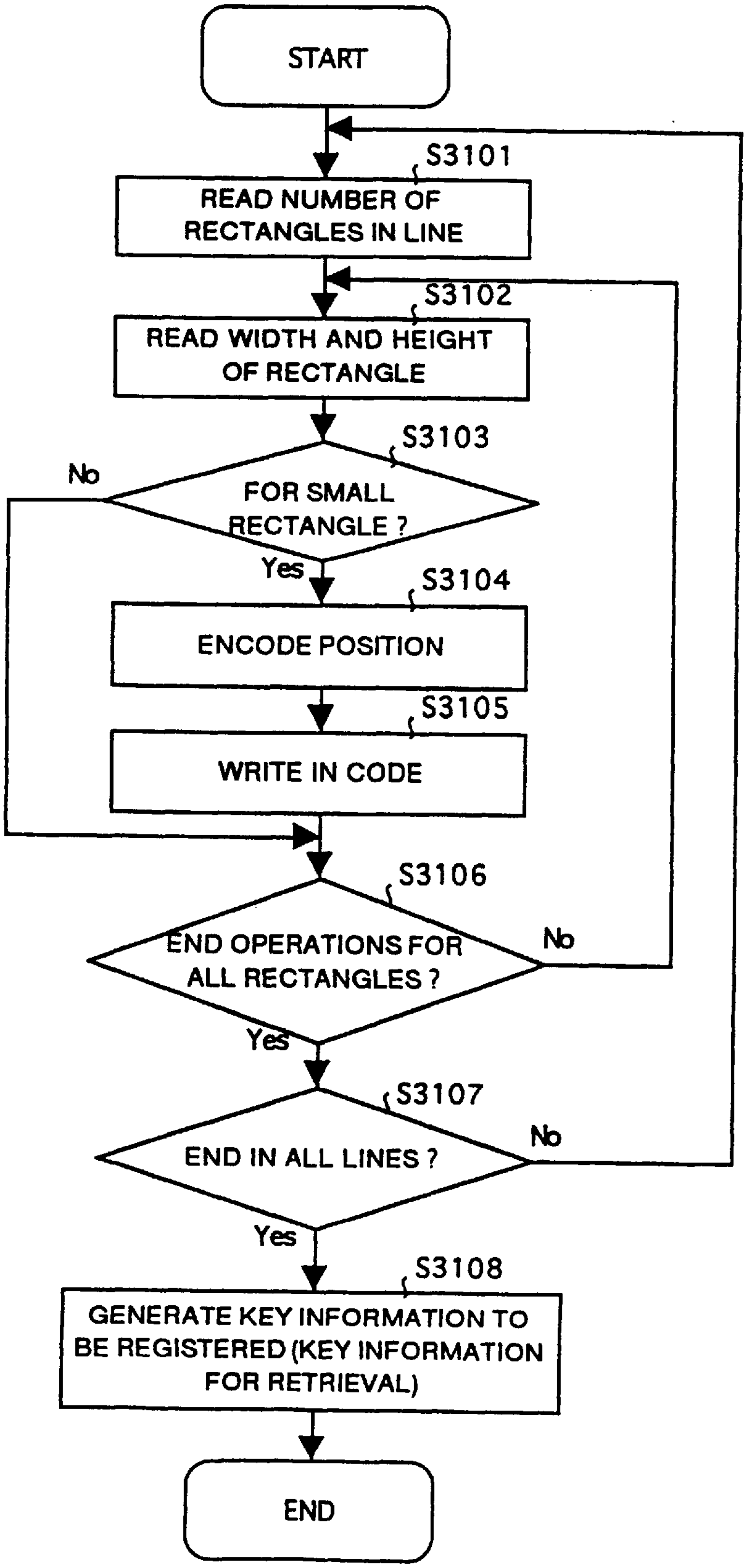
FIG. 31 is a flow chart showing processing in the feature extracting section according to Embodiment 6.

FIG. 31 is a flow chart showing processing in a feature extracting section 410 according to Embodiment 6. The feature extracting section 410, like the feature extracting section according to Embodiment 5, reads out the number of rectangles in a character line from a result of the operation for extracting a text area, reads out a width and a height of the rectangle (S3101 to S3102), determines whether a read-out width and a read-out height are smaller than previously set values (for small rectangles) or not (S3103), and executes the operation in step S3106 in a case where it is determined that the rectangle is not smaller in size.

On the other hand, in a case where it is determined that the rectangle is smaller in size in the step S3103, an image file control section 430 encodes a position of the rectangle (S3104), writes in the code (S3105), and executes operations in steps S3101 to S3105 to all the rectangles in a line (S3106).

Then, the image file control section 430 executes operations in steps S3101 to S3105 to all the lines (S3107), generates key information to be registered (key information for retrieval) from the code (S3108), and terminates the processing.

Figure 32:
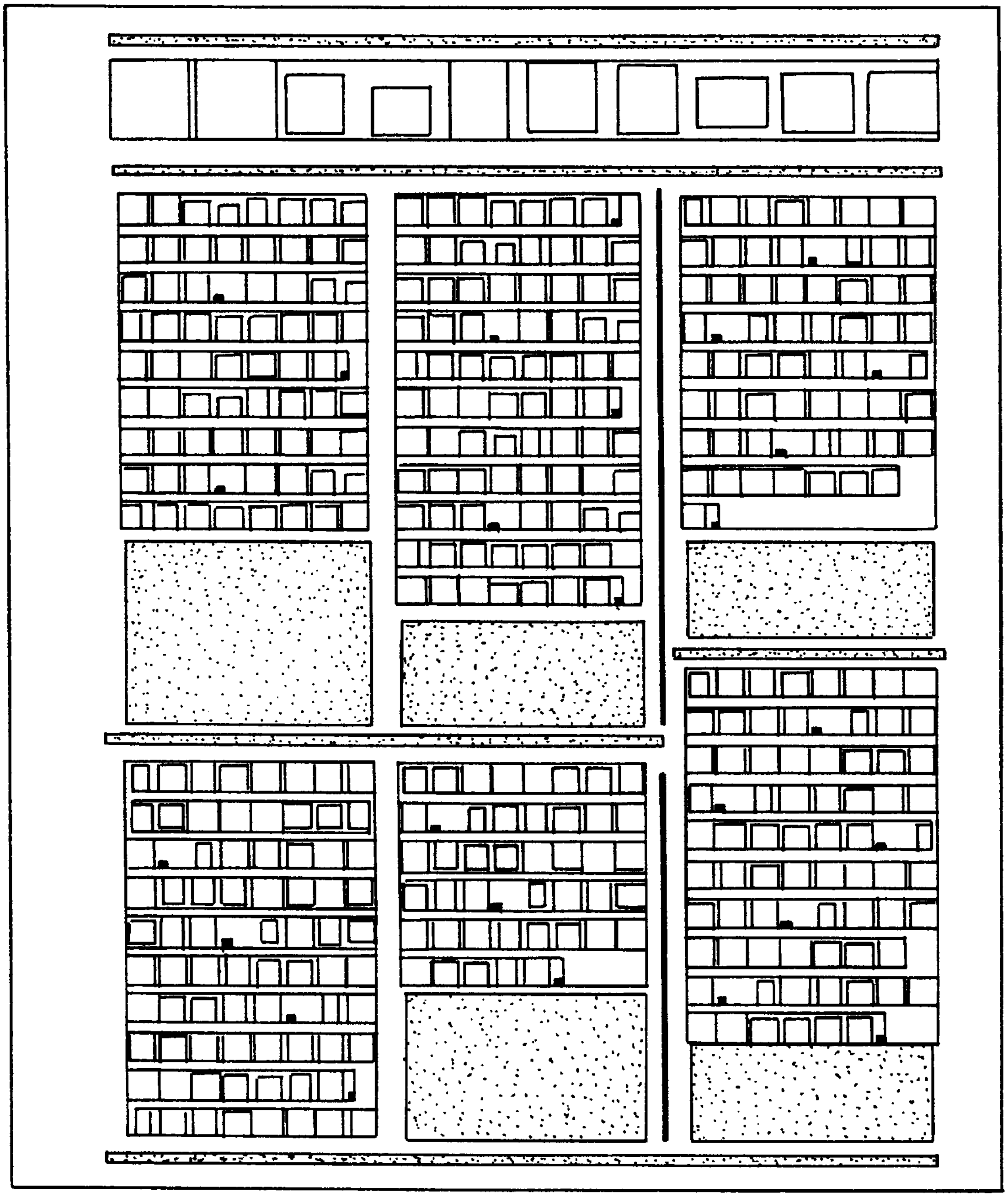
FIG. 32 is an explanatory view showing a result of extracting smaller rectangles such as punctuation marks from a document image according to Embodiment 6.

FIG. 32 shows an example of a state at this point of time. FIG. 32 is a view showing a result of the operation for extracting smaller rectangles such as punctuation marks from a document image according to FIG. 23A, and in this figure a black-out part in the view (■) shows a smaller rectangle. Also FIG. 33 shows positions of extracted small rectangles described with a character area number, a line number in a text area, and a rectangle number in the line; and FIG. 34 is a view showing an example of key information to be registered (key information for retrieval) generated according to the result shown in FIG. 33.

As described above, according to Embodiment 6, an image file is retrieved according to positions of small rectangles such as punctuation marks included in the document image as a keyword, whereby a width of a character in a document is not changed, which means that retrieval of a document image for a text written in only Japanese can easily be executed and at the same time, it is possible to retrieve any image file with a smaller memory space as compared to Embodiment 5.

As described above, the image filing method according to the present invention for storing image data read out from a document in a file as an image file and also retrieving a desired image file from stored image files for output comprises the steps of reading out image data from a document, extracting features of the document from the read-out image data, and generating an image file with the extracted feature in the document correlated to the read-out image data for storage in a case where an image file is to be registered; and also comprises the steps of reading out image data from a document, extracting features of the document from the read-out image data, and retrieving any image file having the document features identical to the retrieval information from the stored image files according to the extracted document features as retrieval information for output in a case where an image file is to be retrieved, so that an image file can be registered without inputting a title or a keyword and also a desired image file can be retrieved according to the necessity.

In the image filing apparatus according to the present invention, when an instruction for registration of an image file is inputted from the instruction inputting means, the registration controlling means reads out image data from a document by controlling the image reading means, extracts features of the document from the read-out image data by controlling the feature extracting means, and generates the image file with the extracted features of the document correlated to the read-out image data for storage in the storing means; and when an instruction for retrieval is inputted from the instruction inputting means, the retrieval controlling means reads out image data from a document by controlling the image reading means, extracts features of the document from the read-out image data by controlling the feature extracting means, retrieves an image file having document features identical to the information for retrieval from the image files stored in the storage means using the extracted features of the document as information for retrieval for output through the image outputting means, so that an image file can be registered without inputting a title or a keyword, and also a desired image file can be retried according to the necessity.

With the image filing apparatus according to the present invention, the feature extracting means extracts information for any area in the read-out image data as a feature of the document, so that area information (format information) for a text area, a photographic area or the like is automatically extracted, and an image file can be registered or retrieved by using the extracted area information as a feature of the document or information for retrieval, which enables retrieval of an image file with a small memory space. Especially an image spreading over a multiple columns in magazines, newspapers or the like can easily be registered and retrieved.

The image filing apparatus according to the present invention, the feature extracting means extracts information for a starting position of a line in a text area as well as for a length of the line in the read-out image data as features of the document, so that a distance of a line included in a text area in image data for a document from the boundary area and a length thereof can be used as features of the document or information for retrieval for registering or retrieving the image file.

The image filing apparatus according the present invention, the feature extracting means extracts information for a starting position of a line in a text area as well as for the number of rectangles of characters included in the line in the read-out image data as feature in the document, so that an image file can be identified with high precision in registration or retrieval.

In the image filing apparatus according to the present invention, the registration controlling means generates, in a case a title or a keyword is inputted from the instruction inputting means, an image file with the title or keyword correlated to the extracted document features as well as to the read-out image data for storage in the storing means, and retrieval controlling means retrieves, in a case where a title or keyword is inputted from the instruction inputting means, a image file having the title or keyword identical to the retrieval information from the image files stored in the storing means according to the title or keyword as information for retrieval for output through the image outputting means, so that a desired image file can be retrieved from a document in a case where the title or keyword is unknown, or in a case where an identical title or keyword is assigned to a plurality of image files.

The image filing apparatus according to the present invention comprises an instruction inputting means for inputting instructions for registering and retrieving an image file; an image reading means for optically reading out image data from a document; an image file storing means for storing therein the image data read out by the image reading means as an image file; a registration controlling means for reading out image data from the document by controlling the image reading means in a case where an instruction for registration of an image file is inputted from the instruction inputting means, and generating an image file for the read-out image data to be stored in the storing means; and a retrieval controlling means for retrieving an appropriate image file from the image files stored in the storing means in a case where an instruction for retrieval of an image file is inputted from the instruction inputting means for output through the image outputting means; and further the image filing apparatus has a feature extracting means for extracting a ratio of a width vs a height of each rectangular of character in a text area from the image data read out by the image reading means as a feature of the document, and the registration controlling means reads out, in a case where an instruction for registration of an image file is inputted from the instruction inputting means, image data from a document by controlling the image reading means, extracts features of the document from the read-out image data by controlling the feature extracting means, and generates an image file with the extracted features of the document correlated to the read-out image data to be stored in the storing means; and the retrieval controlling means reads out, in a case where an instruction for retrieval of an image file is inputted from the instruction inputting means, image data from a document by controlling the image reading means, extracts features of the document from the read-out image data by controlling the feature extracting means, and retrieves any image file having the document feature identical to the retrieval information from the image files stored in the storing means according to the extracted document features as retrieval information for output through the image outputting means, so that an image file can be registered without inputting a title, a keyword, or the like, and also desired file can be retrieved according to the necessity.

In the image filing apparatus according to the present invention, the feature extracting means extracts information for positions of rectangles of characters each having a small size among rectangles of characters in a text area in the read-out image data as a feature of the document, so that file retrieval can be executed according to positional information for rectangles of characters each having a small size such as punctuation marks in a text. This feature is effective for discrimination (retrieval) of images having a similar layout in magazines or newspapers, and also features of a document can be stored with a small memory space.

The image filing apparatus according to the present invention, the registration controlling means generates, in a case where any title or keyword is inputted from the instruction inputting means, an image file with the title or keyword correlated to the extracted document features as well as to the read-out image data, and stores the image file in the storing means; and the retrieval controlling means retrieves, in a case where any title or keyword is inputted from the instruction inputting means, any image file having the title or keyword identical to the retrieval information from the image files stored in the storing means according to the title or keyword as retrieval information, and outputs the image file through the image outputting means, so that retrieval can be executed using a title or a keyword, and also a desired image file can be retrieved from a document in a case where the title or keyword is unknown, or even in a case where an identical title or a keyword is assigned to a plurality of image files.

Namely, when an image file is to be registered, features of a document are extracted from the read-out image data for storage, and when an image file is to be retrieved, a desired image file can be retrieved by extracting document features of the read-out image data and using the document features as information for retrieval, and also image file retrieval can be executed by inputting the title or the keyword.

This application is based on Japanese patent application Nos. HEI 8-035840, HEI 8-035842 and HEI 8-229396 filed in the Japanese Patent Office on Jan. 31, 1996, Jan. 31, 1996 and Aug. 13, 1996, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image filing method for storing image data read out from a document in a file as an image file and also retrieving a desired image file from stored image files for output, the method comprising the steps of:

in a case where the image file is to be registered for storage: reading out image data from a first document, extracting layout features of the first document from said read-out image data, and generating an image file with said layout features correlated to said read-out image data, said layout features of the first document indicating geometrical properties of elements within the first document; and in a case where the desired image file is to be retrieved for output: reading out image data from a second document, extracting layout features of the second document from said read-out image data, and retrieving any of the stored image files having registered layout features corresponding to said layout features of the second document as the desired image file, said layout features of the second document indicating geometrical properties of elements within the second document.

2. An image filing apparatus comprising:

an instruction inputting means for inputting instructions for registering and retrieving an image file;

an image reading means for optically reading out image data from a document;

an image file storing means for storing therein the image data read out by said image reading means as an image file;

a registration controlling means for reading out image data from the document by controlling the image reading means in a case where an instruction for registration of an image file is inputted from said instruction inputting means, generating an image file for said read-out image data to be stored in said storing means; and a retrieval controlling means for retrieving an appropriate image file from the image files stored in said storing means in a case where an instruction for retrieval of an image file is inputted from said instruction inputting means and outputting the retrieved image file through said image outputting means;

wherein said image filing apparatus has a feature extracting means for extracting layout features of the document from the image data read out by the image reading means, said layout features indicating geometrical properties of elements within the document;

wherein said registration controlling means reads out, in a case where an instruction for registration of an image file is inputted from said instruction inputting means, image data from a first document by controlling the image reading means, extracts layout features of the first document from the read-out image data by controlling said feature extracting means, and generates an image file with the layout features of the document correlated to said read-out image data to be stored in said storing means; and said retrieval controlling means reads out, in a case where an instruction for retrieval of a desired image file is inputted from the instruction inputting means, image data from a second document by controlling said image reading means, extracts layout features in the second document from said read-out image data by controlling said feature extracting means, and retrieves any of the stored image files as the desired image file based on comparing layout features from said image files stored in said storing means and said layout features to be outputted through said image outputting means.

3. An image filing apparatus according to claim 2, wherein the layout features indicate information for a starting position of a line in a text area as well as for a length of the line in said read-out image data.

4. An image filing apparatus according to claim 2, wherein the layout features indicate information for a starting position of a line in a text area as well as for the number of rectangles of characters included in the line in said read-out image data.

5. An image filing apparatus according to claim 2, wherein:

said registration controlling means generates, in a case where any title or keyword is inputted from said instruction inputting means, an image file with said title or keyword correlated to said layout features as well as to said read-out image data, and stores the image file in said storing means; and said retrieval controlling means retrieves, in a case where any title or keyword is inputted through said instruction inputting means, any of the stored image files based on comparing said title or keyword in said image files stored in said storing means and said title or keyword as retrieval information, and outputs the image file through said image outputting means.

6. An image filing apparatus according to claim 2, wherein the layout features indicate includes information for any area in said read-out image data.

7. An image filing apparatus according to claim 6, wherein the layout features indicate information for a starting position of a line in a text area as well as for a length of the line in said read-out image data.

8. An image filing apparatus according to claim 6, wherein the layout features indicate information for a starting position of a line in a text area as well as for the number of rectangles of characters included in the line in said read-out image data.

9. An image filing apparatus comprising:

an instruction inputting means for inputting instructions for registering and retrieving an image file;

an image reading means for optically reading out image data from a document;

an image file storing means for storing therein the image data read out by said image reading means as an image file;

a registration controlling means for reading out image data from the document by controlling said image reading means in a case where an instruction for registration of an image file is inputted from said instruction inputting means, and generating an image file for said read-out image data to be stored in the storing means; and a retrieval controlling means for retrieving an appropriate image file from the image files stored in said storing means, in a case where an instruction for retrieval of an image file is inputted from said instruction inputting means, and outputting the retrieved image file through said image outputting means;

wherein said image filing apparatus has a feature extracting means for extracting a ratio of a width vs a height of each rectangle of character in a text area from the image data read out by said image reading means as a feature as layout information of the document;

wherein said registration controlling means reads out, in a case where an instruction for registration of an image file is inputted from said instruction inputting means, image data from a document by controlling said image reading means, extracts features of the document from said read-out image data by controlling said feature extracting means, and generates an image file with said extracted features of the document correlated to said read-out image data to be stored in said storing means; and wherein said retrieval controlling means reads out, in a case where an instruction for retrieval of a desired image file is inputted from said instruction inputting means, image data from a document by controlling said image reading means, extracts features of the document from said read-out image data by controlling said feature extracting means, and retrieves any of the stored image files as the desired image file based on comparing said document feature from said image files stored in said storing means and said extracted document features as retrieval information for output through said image outputting means.

10. An image filing apparatus according to claim 9, wherein:

said registration controlling means generates, in a case where any title or keyword is inputted from the instruction inputting means, an image file with said title or keyword correlated to said extracted document features as well as to said read-out image data, and stores the image file in said storing means; and said retrieval controlling means retrieves, in a case where any title or keyword is inputted from said instruction inputting means, any of the stored image files based on comparing the title or keyword of said image files stored in said storing means and said title or keyword as retrieval information, and outputs the image file through said image outputting means.

11. An image filing apparatus according to claim 9, wherein the layout information further includes information for positions of rectangles of characters each having a small size among rectangles of characters in a text area in said read-out image data as a feature of the document.

12. An image filing apparatus according to claim 11, wherein:

said registration controlling means generates, in a case where any title or keyword is inputted from the instruction inputting means, an image file with said title or keyword correlated to said extracted document features as well as to said read-out image data, and stores the image file in said storing means;

and said retrieval controlling means retrieves, in a case where any title or keyword is inputted from said file having the title information from said any title or keyword is inputted from said instruction inputting means, any of the image files based on comparing the title or keyword of said image files stored in said storing means and said title or keyword as retrieval information, and outputs the image file through said image outputting means.

* * * * *